US012307114B2

(12) United States Patent
Shin et al.

(10) Patent No.: US 12,307,114 B2
(45) Date of Patent: May 20, 2025

(54) MEMORY DEVICE FOR EFFECTIVELY PERFORMING READ OPERATION, AND OPERATION METHOD THEREOF

(71) Applicant: SK hynix Inc., Icheon-si (KR)

(72) Inventors: Beom Ju Shin, Icheon-si (KR); Tae Hee You, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 239 days.

(21) Appl. No.: 17/864,094

(22) Filed: Jul. 13, 2022

(65) Prior Publication Data

US 2023/0289083 A1  Sep. 14, 2023

(30) Foreign Application Priority Data

Mar. 8, 2022  (KR) .................. 10-2022-0029293

(51) Int. Cl.
*G06F 3/06* (2006.01)
(52) U.S. Cl.
CPC ............ *G06F 3/0644* (2013.01); *G06F 3/061* (2013.01); *G06F 3/0656* (2013.01); *G06F 3/0679* (2013.01)
(58) Field of Classification Search
CPC ...... G06F 3/061; G06F 3/0611; G06F 3/0644; G06F 3/0656; G06F 3/0659; G06F 3/0679; G06F 3/0688; G11C 16/10; G11C 16/26; G11C 29/42
See application file for complete search history.

(56) References Cited

U.S. PATENT DOCUMENTS

| 2007/0113000 A1* | 5/2007 | Murin ................... G11C 16/26 |
| | | 711/103 |
| 2016/0011779 A1* | 1/2016 | Lee ........................ G11C 16/08 |
| | | 711/103 |
| 2016/0202914 A1* | 7/2016 | Hsu ....................... G06F 3/0683 |
| | | 711/158 |
| 2019/0121740 A1 | 4/2019 | Kabra et al. |
| 2019/0214092 A1* | 7/2019 | Jang ....................... G11C 16/26 |
| 2022/0189559 A1* | 6/2022 | Chen ..................... G11C 7/1057 |

* cited by examiner

*Primary Examiner* — Larry T Mackall
(74) *Attorney, Agent, or Firm* — WILLIAM PARK & ASSOCIATES LTD.

(57) ABSTRACT

A memory device may include: a plurality of planes, each suitable for inputting/outputting data in units of pages, a latch suitable for performing a read operation on one or more planes of the plurality of planes in response to one or more read commands, receiving data from any one plane, among the plurality of planes, and storing the received data, and a logic controller suitable for comparing first plane information, corresponding to the data that is stored in the latch, to second plane information, corresponding to an output command that is received after the read command is received, in response to the output command, and suitable for selectively outputting the data of the latch.

20 Claims, 11 Drawing Sheets

MEMORY DEVICE FOR EFFECTIVELY PERFORMING READ OPERATION, AND OPERATION METHOD THEREOF

CROSS-REFERENCE TO RELATED APPLICATION

This application claims priority under 35 U.S.C. § 119 to Korean Patent Application No. 10-2022-0029293 filed on Mar. 8, 2022, which is incorporated herein by reference in its entirety.

BACKGROUND

1. Field

Exemplary embodiments relate to a storage device, and particularly, to a memory device for effectively performing a read operation, and an operation method thereof.

2. Discussion of the Related Art

A storage device refers to a device that stores data under the control of a host device, such as a computer or smart phone. The storage device may include a memory device for storing data therein and a memory controller for controlling the memory device. The memory device is divided into a volatile memory device and a non-volatile memory device.

The non-volatile memory device is a memory device that retains data that is stored therein even though power supply is cut off. The non-volatile memory device may include memory cells and may perform a program operation that stores data in the memory cells, a read operation that reads the stored data, and an erase operation that erases the stored data.

SUMMARY

In an embodiment, a memory device may include: a plurality of planes, each suitable for inputting/outputting data in units of pages; a latch suitable for performing a read operation on one or more planes of the plurality of planes in response to one or more read commands, receiving data from any one plane, among the plurality of planes, and storing the received data; and a logic controller suitable for comparing first plane information, corresponding to the data that is stored in the latch, to second plane information, corresponding to an output command that is received after the read command is received, in response to the output command, and suitable for selectively outputting the data of the latch.

In an embodiment, an operation method of a memory device which comprises a plurality of planes, each suitable for inputting/outputting data in units of pages and a latch that is shared by the plurality of planes, the operation method may include: performing a read operation on one or more planes of the plurality of planes in response to one or more read commands, receiving data from any one plane, and storing the received data; and comparing first plane information, corresponding to the data that is stored in the latch, to second plane information, corresponding to an output command that is received after the read command is received, in response to the output command, and selectively outputting the data.

DETAILED DESCRIPTION

Figure 1A:
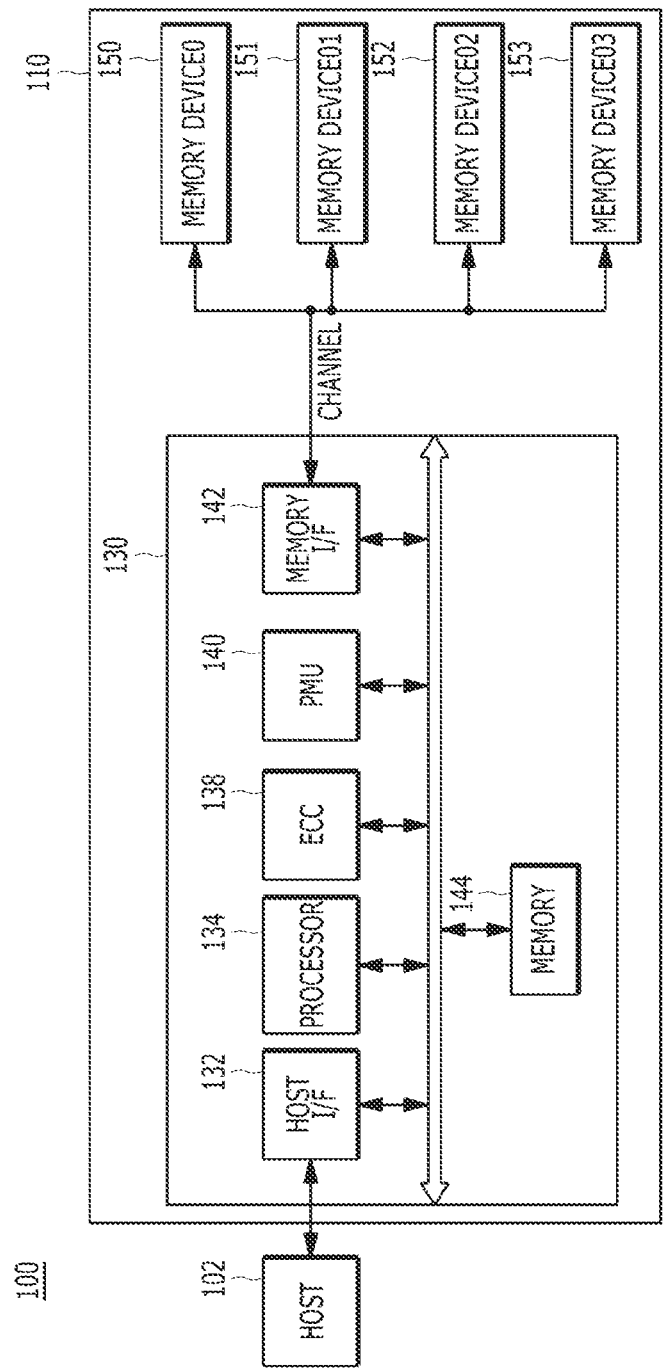
FIGS. 1A and 1B are diagrams for describing a memory system including a memory device in accordance with an embodiment.

Various embodiments of the present disclosure are described below with reference to the accompanying drawings. Elements and features of the disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or might not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in the disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which may be represented by a sequence of bits. According to an embodiment, the data item may include a discrete object. According to another embodiment, the data item may include a unit of information within a transmission packet between two different components.

Various embodiments are directed to a memory device capable of minimizing read latency by effectively performing a read operation, and an operation method thereof.

The technical problems of the present disclosure are not limited to those mentioned above, and other technical problems which are not mentioned may be clearly understood by the person skilled in the art from the following descriptions.

Through this operation, the data may be copied into the latch at a point of time before the input of the output command, which makes it possible to minimize the latency of the read operation.

Figure 1B:
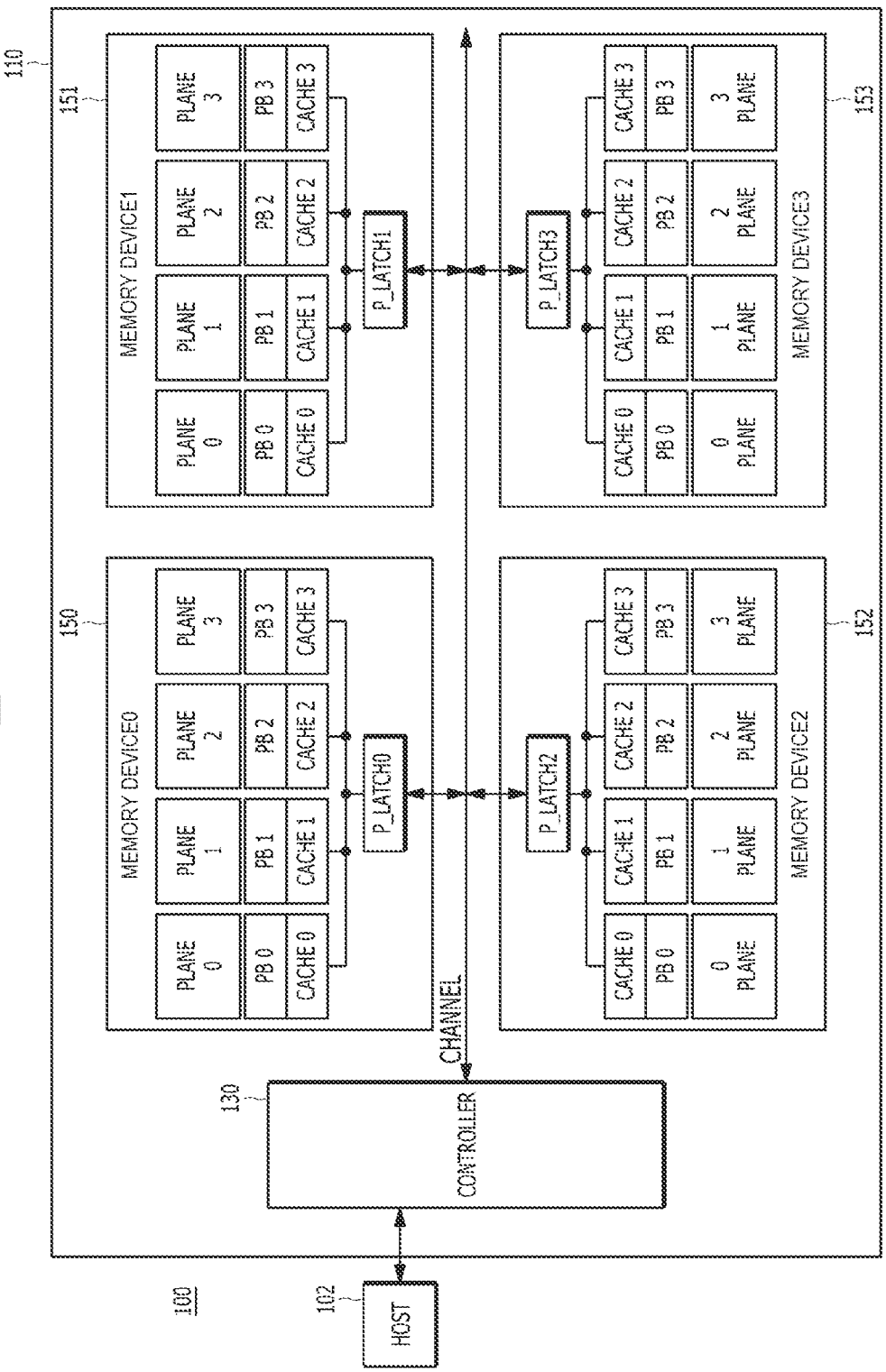

FIGS. 1A and 1B are diagrams for describing a memory system including a memory device in accordance with an embodiment.

Referring to FIGS. 1A and 1B, the data processing system 100 may include a host 102 engaged or operably coupled with the memory system 110.

The host 102 may include any of a portable electronic device, such as a mobile phone, an MP3 player, a laptop computer, or the like, and an electronic device, such as a desktop computer, a game player, a television (TV), a projector, or the like.

The memory system 110 may operate in response to a request from the host 102, and, in particular, may store data to be accessed by the host 102. In other words, the memory system 110 may be used as a main memory device or an auxiliary memory device of the host 102. The memory system 110 may be implemented as any one of various types of storage devices, depending on the host interface protocol that is coupled with the host 102. For example, the memory system 110 may be implemented as any one of a solid state driver (SSD), a multimedia card (e.g., an MMC, an embedded MMC (eMMC), a reduced size MMC (RS-MMC) and a micro-MMC), a secure digital card (e.g., an SD, a mini-SD and a micro-SD), a universal serial bus (USB) storage device, a universal flash storage (UFS) device, a compact flash (CF) card, a smart media card, and a memory stick.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and a flash memory.

The memory system 110 may include a controller 130 and a memory device 150. The memory device 150 may store data to be accessed by the host 102. The controller 130 may control an operation that stores data in the memory device 150.

The controller 130 and the memory device 150 that are included the memory system 110 may be integrated into a single semiconductor device, which may be included in any of the various types of memory systems as discussed above in the examples.

By way of example, but not limited thereto, the controller 130 and memory device 150 may be implemented with an SSD. When the memory system 110 is used as an SSD, the operating speed of the host 102 that is connected to the memory system 110 may be improved more than that of the host 102 that is implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device that is capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The plurality of memory devices 150 to 153 may be a nonvolatile memory device and may retain data that is stored therein, even while electrical power is not supplied. The plurality of memory devices 150 to 153 may store data that is provided by the host 102 through a write operation and provide data that is stored therein to the host 102 through a read operation.

The controller 130 in the memory system 110 may control the plurality of memory devices 150 to 153 in response to a request from the host 102. For example, the controller 130 may provide data that is read from the plurality of memory devices 150 to 153 to the host 102 and may store data that is provided from the host 102 in the plurality of memory devices 150 to 153. To this end, the controller 130 may control read, write, program, and erase operations of the plurality of memory devices 150 to 153.

The controller 130 may include a host interface 132, a processor 134, error correction code (ECC) circuitry 138, a memory interface 142, and a memory 144.

The host 102 and the memory system 110 each may include a controller or an interface for transmitting and receiving signals, data, and the like, in accordance with one or more predetermined protocols. For example, the host interface 132 in the memory system 110 may include an apparatus that is capable of transmitting signals, data, and the like to the host 102 or capable of receiving signals, data, and the like from the host 102.

The host interface 132 that is included in the controller 130 may receive signals, commands (or requests), and/or data input from the host 102 via a bus. For example, the host 102 and the memory system 110 may use a predetermined set of rules or procedures for data communication or a preset interface to transmit and receive data therebetween. Examples of sets of rules or procedures for data communication or interfaces that are supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host interface 132 may be a type of layer for exchanging data with the host 102 and is implemented with, or driven by, firmware called a host interface layer (HIL). According to an embodiment, the host interface 132 may include a command queue.

The Integrated Drive Electronics (IDE) or Advanced Technology Attachment (ATA) may be used as one of the interfaces for transmitting and receiving data and, for example, may use a cable including 40 wires that are connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 that is set as the master may be used as a main memory device. The IDE (ATA) may include, for example, Fast-ATA, ATAPI, or Enhanced IDE (EIDE).

A Serial Advanced Technology Attachment (SATA) interface is a type of serial data communication interface that is compatible with various ATA standards of parallel data communication interfaces that are used by Integrated Drive Electronics (IDE) devices. The 40 wires in the IDE interface may be reduced to six wires in the SATA interface. For example, 40 parallel signals for the IDE may be converted into 6 serial signals for the SATA interface. The SATA interface has been widely used because of its faster data transmission and reception rate and its lower resource consumption in the host 102 that is used for the data transmission and reception. The SATA interface may connect up to 30 external devices to a single transceiver that is included in the host 102. In addition, the SATA interface may support hot plugging that allows an external device to be attached to or detached from the host 102, even while data communication between the host 102 and another device is being executed. Thus, the memory system 110 may be connected or disconnected as an additional device, like a device supported by a universal serial bus (USB) even when the host 102 is powered on. For example, in the host 102 having an eSATA port, the memory system 110 may be freely attached to or detached from the host 102, like an external hard disk.

Small Computer System Interface (SCSI) is a type of serial data communication interface that is used for connecting a computer or a server with other peripheral devices. The SCSI may provide a high transmission speed as compared with other interfaces, such as IDE and SATA. In the SCSI, the host 102 and at least one peripheral device (e.g., memory system 110) may be connected in series, but data transmission and reception between the host 102 and each peripheral device may be performed through a parallel data communication. In the SCSI, it is easy to connect or disconnect a device, such as the memory system 110 to or from the host 102. The SCSI may support connections of 15 other devices to a single transceiver that is included in host 102.

Serial Attached SCSI (SAS) may be understood as a serial data communication version of the SCSI. In the SAS, the host 102 and a plurality of peripheral devices are connected in series, and data transmission and reception between the host 102 and each peripheral device may be performed in a serial data communication scheme. The SAS may support a connection between the host 102 and the peripheral device through a serial cable, instead of a parallel cable, to easily manage equipment by using the SAS and may enhance or improve operational reliability and communication performance. The SAS may support connections of eight external devices to a single transceiver that is included in the host 102.

The Non-volatile memory express (NVMe) is a type of interface based on at least a Peripheral Component Interconnect Express (PCIe) that is designed to increase performance and design flexibility of the host 102, servers, computing devices, and the like that is equipped with the non-volatile memory system 110. The PCIe may use a slot or a specific cable for connecting a computing device (e.g., host 102) and a peripheral device (e.g., memory system 110). For example, the PCIe may use a plurality of pins (e.g., 18 pins, 32 pins, 49 pins, or 82 pins) and at least one wire (e.g., x1, x4, x8, or x16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe may support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a type of scalable, hot-pluggable plug-and-play serial interface that may provide cost-effective standard connectivity between the host 102 and peripheral devices, such as a keyboard, a mouse, a joystick, a printer, a scanner, a storage device, a modem, a video camera, and the like. A plurality of peripheral devices, such as the memory system 110, may be coupled to a single transceiver that is included in the host 102.

The ECC component 138 may correct error bits of the data to be processed in (e.g., output from) the plurality of memory devices 150 to 153, which may include an ECC encoder and an ECC decoder. Here, the ECC encoder may perform error correction encoding of data to be programmed in the plurality of memory devices 150 to 153 to generate encoded data into which a parity bit is added and may store the encoded data in memory device 150. The ECC decoder may detect and correct errors that are contained in a data that is read from the plurality of memory devices 150 to 153 when the controller 130 reads the data that is stored in the plurality of memory devices 150 to 153. In other words, after performing error correction decoding on the data that is read from the plurality of memory devices 150 to 153, the ECC component 138 may determine whether the error correction decoding has succeeded and may output an instruction signal (e.g., a correction success signal or a correction fail signal). The ECC component 138 may use the parity bit that is generated during the ECC encoding process to correct the error bit of the read data. When the number of error bits is greater than or equal to a threshold number of correctable error bits, the ECC component 138 might not correct error bits but instead may output an error correction fail signal, indicating failure in correcting the error bits.

The ECC component 138 may perform an error correction operation based on a coded modulation, such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include any and all circuits, modules, systems, or devices for performing the error correction operation based on at least one of the above described codes.

The memory Interface 142 may serve as an interface for handling commands and data that are transferred between the controller 130 and the plurality of memory devices 150 to 153, allowing the controller 130 to control the plurality of memory devices 150 to 153 in response to a request that is delivered from the host 102. The memory interface 142 may generate a control signal for the plurality of memory devices 150 to 153 and may process data that is entered into or output from the plurality of memory devices 150 to 153 under the control of the processor 134 when the plurality of memory devices 150 to 153 is a flash memory and, in particular, when the plurality of memory devices 150 to 153 is a NAND flash memory. The memory interface 142 may provide an Interface for handling commands and data between the controller 130 and the plurality of memory devices 150 to 153 (i.e., operations of NAND flash interface, in particular, operations between the controller 130 and the plurality of memory devices 150 to 153). In accordance with an embodiment, the memory interface 142 may be implemented through firmware called a Flash Interface Layer (FIL) as a component for exchanging data with the plurality of memory devices 150 to 153.

The memory 144 may support operations that are performed by the memory system 110 and the controller 130. The memory 144 may store temporary or transactional data that occurred or was delivered for operations in the memory system 110 and the controller 130. The controller 130 may control the plurality of memory devices 150 to 153 in response to a request from the host 102. The controller 130 may deliver data that is read from the plurality of memory devices 150 to 153 into the host 102. The controller 130 may store data, entered through the host 102, within the plurality of memory devices 150 to 153. The memory 144 may be used to store data for the controller 130 and the plurality of memory devices 150 to 153 in order to perform operations, such as read operations or program/write operations or erase operation.

When the controller 130 controls read, write, program, and erase operations of the plurality of memory devices 150 to 153, data to be transferred or generated between the controller 130 and the plurality of memory devices 150 to 153 in the memory system 110 may be stored in the memory 144. For example, the memory 144 may store data that is necessary to perform data write and read operations between the host 102 and the plurality of memory devices 150 to 153 and data when performing the data write and read operations. For such data storage, the memory 144 may include a program memory, a data memory, a write buffer/cache, a read buffer/cache, a data buffer/cache, a map buffer/cache, and so forth.

The memory 144 may be realized by a volatile memory. For example, the memory 144 may be realized by a static random access memory (SRAM) or a dynamic random access memory (DRAM). The memory 144 may exist inside the controller 130 as illustrated in the drawing. Alternatively, the memory 144 may exist outside of the controller 130, unlike the illustration of the drawing. In this case, the memory 144 may be realized as an external volatile memory that outputs to and receives data from the controller 130 through a separate memory interface.

The processor 134 may control the entire operations of the memory system 110. In particular, in response to a write request or a read request from the host 102, the processor 134 may control a program operation or a read operation for the plurality of memory devices 150 to 153. The processor 134 may drive firmware, which is referred to as a flash translation layer (FTL), to control general operations of the memory system 110. The processor 134 may be realized by a microprocessor or a central processing unit (CPU).

Even while electrical power is not supplied, the plurality of memory devices 150 to 153 may be a nonvolatile memory device and may retain data that is stored therein. The plurality of memory devices 150 to 153 may store data that is provided by the host 102 through a write operation and provide data that is stored therein to the host 102 through a read operation.

The plurality of memory devices 150 to 153 may each include a plurality of planes PLANE0, PLANE1, PLANE2, and PLANE3 and a pipe latch (one of P_LATCH<0:3>). Although not illustrated in the drawings, each of the planes PLANE0, PLANE1, PLANE2, and PLANE3 may include a plurality of memory blocks, each of which includes a plurality of pages, each including a plurality of memory cells to which a plurality of word lines are coupled. In addition, the plurality of memory devices 150 to 153 may be a flash memory, and the flash memory may have a three-dimensional stack structure.

In an embodiment of the present disclosure, the plurality of memory devices 150 to 153 may be a nonvolatile memory, such as a flash memory that is a NAND flash memory, a NOR flash memory, or the like. In another embodiment, the plurality of memory devices 150 to 153 may be at least one of a phase change random access memory (PCRAM), a ferroelectric random access memory (FRAM), and a spin injection magnetic memory (e.g., a spin transfer torque magnetic random access memory (STT-MRAM)).

The plurality of memory devices 150 to 153 may include a plurality of memory blocks. Each of the plurality of memory blocks may be a single level cell (SLC) memory block or a multi-level cell (MLC) memory block, according to the number of bits that may be stored or represented in one memory cell of such block. Here, the SLC memory block may include a plurality of pages that are implemented by memory cells, each storing one bit of data. The SLC memory block may have high data I/O operation performance and high durability. The MLC memory block may include a plurality of pages that are implemented by memory cells, each storing multi-bit data (e.g., two bits or more). The MLC memory block may have a larger storage capacity for the same space compared to the SLC memory block. The MLC memory block may be highly integrated in terms of storage capacity. In an embodiment, the plurality of memory devices 150 to 153 may be implemented with MLC memory blocks, such as a double level cell memory block, a triple level cell (TLC) memory block, a quadruple level cell (QLC) memory block, or a combination thereof. The double level memory block may include a plurality of pages that are implemented by memory cells, each capable of storing 2-bit data. The triple level cell (TLC) memory block may include a plurality of pages that are implemented by memory cells, each capable of storing 3-bit data. The quadruple level cell (QLC) memory block may include a plurality of pages that are implemented by memory cells, each capable of storing 4-bit data. In another embodiment, the plurality of memory devices 150 to 153 may be implemented with a block including a plurality of pages that are implemented by memory cells, each capable of storing 5 or more bits of data.

One pipe latch (one of P_LATCH<0:3>), included in each of the memory devices 150 to 153, may be shared by the plurality of planes PLANE0, PLANE1, PLANE2, and PLANE3 that are included in each of the memory devices 150 to 153. In an embodiment, four planes PLANE0, PLANE1, PLANE2, and PLANE3 that are included in the first memory device 150 may share one pipe latch P_LATCH0, four planes PLANE0, PLANE1, PLANE2, and PLANE3 that are included in the second memory device 151 may share one pipe latch P_LATCH1, four planes PLANE0, PLANE1, PLANE2, and PLANE3 that are included in the third memory device 152 may share one pipe latch P_LATCH2, and four planes PLANE0, PLANE1, PLANE2, and PLANE3 that are included in the fourth memory device 153 may share one pipe latch P_LATCH3. In this case, the configuration in which four planes share one pipe latch may indicate that, during a program operation, data that is input from the controller 130 may be transferred and stored into one pipe latch, and then the data that is stored in the one pipe latch may be transferred and programmed to any one of the four planes. Furthermore, the configuration in which four planes share one pipe latch may indicate that, during a read operation, data that is read from any one plane of the four planes may be transferred and stored into one pipe latch, and then the data that is stored in the one pipe latch may be output to the controller 130.

The plurality of planes PLANE0, PLANE1, PLANE2, and PLANE3 may include a plurality of page buffers PB0, PB1, PB2, and PB3 and a plurality of cache buffers CACHE0, CACHE1, CACHE2, and CACHE3, respectively. When read operations are performed on the plurality of planes PLANE0, PLANE1, PLANE2, and PLANE3, respectively, a plurality of data that is read into the respective page buffers PB0, PB1, PB2, and PB3 may be migrated to the plurality of cache buffers CACHE0, CACHE1, CACHE2, and CACHE3, respectively, and then the plurality of data that is stored in the respective cache buffers CACHE0, CACHE1, CACHE2, and CACHE3 may be sequentially transferred to one pipe latch and then output to the controller 130.

For reference, FIG. 1B illustrates that the memory system 110 includes four memory devices 150 to 153. However, this is only an example, and a larger or smaller number of memory devices may be included in one memory system. Furthermore, FIG. 1B illustrates that the four planes PLANE0, PLANE1, PLANE2, and PLANE3 are included in one memory device 150, 151, 152, or 153. However, this is only an example, and a larger or smaller number of planes may be included in one memory device.

Figure 2A:
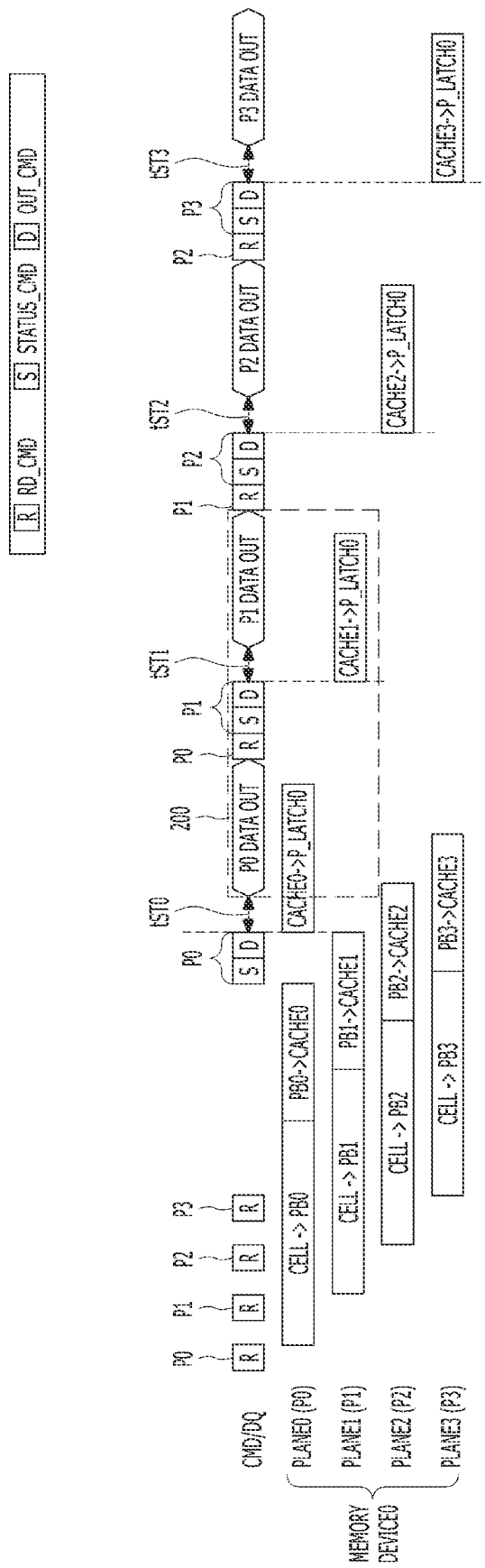
FIGS. 2A and 2B are timing diagrams for describing an example of a read operation performed by the memory device in accordance with the present embodiment.
Figure 2B:
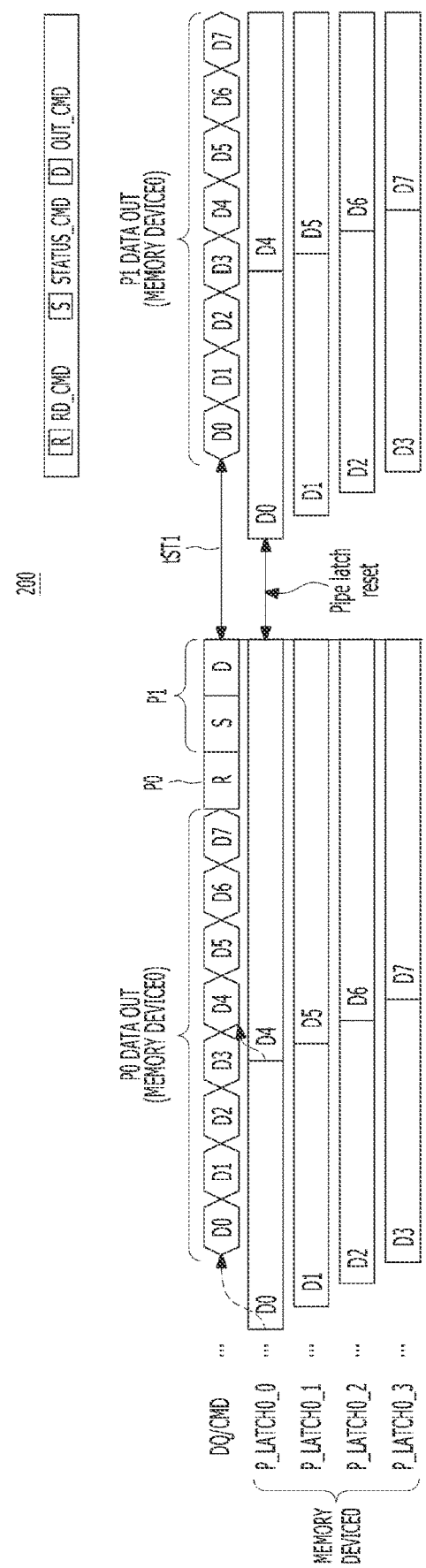

FIGS. 2A and 2B are timing diagrams for describing an example of a read operation performed by the memory device in accordance with the present embodiment.

FIGS. 2A and 2B show how read operations are sequentially performed on the respective planes PLANE0, PLANE1, PLANE2, and PLANE3 that are included in any one of the memory devices 150 to 153. Hereafter, an operation of the first memory device 150, among the plurality of memory devices 150 to 153, will be described as an operation of a memory device. However, the same type of operation as that of the first memory device 150 may be performed by each of the other memory devices 151 to 153.

Referring to FIG. 2A, the controller 130 may generate a read command RD_CMD, a status command STATUS_CMD, and an output command OUT_CMD in response to a read operation that is requested by a host 102 and may transfer the generated commands to the memory device 150.

The memory device 150 may read data from any one of the planes PLANE0, PLANE1, PLANE2, and PLANE3 in response to the read command RD_CMD. That is, the memory device 150 may read, into the corresponding page buffer, data that is stored in any one plane that is selected as a read target in response to the read command RD_CMD and then migrate the data of the page buffer to the corresponding cache buffer.

In response to the status command STATUS_CMD, the memory device 150 may check whether the read operation has been completed in any one plane, among the plurality of planes PLANE0, PLANE1, PLANE2, and PLANE3, selected as the read target, or whether the data is stored in the cache buffer of the plane that is selected as the read target and may transfer the check result to the controller 130.

In response to the output command OUT_CMD, the memory device 150 may transfer, to the pipe latch P_LATCH0, the data that is stored in the cache buffer of the plane, among the plurality of planes PLANE0, PLANE1, PLANE2, and PLANE3, selected as the read target, and then may output the data to the controller 130 through the pipe latch P_LATCH0.

In an embodiment, it may be assumed that read requests are sequentially generated for the four planes PLANE0, PLANE1, PLANE2, and PLANE3 that are included in the memory device 150, respectively. That is, as illustrated in FIG. 2A, a read command P0, RD_CMD for the first plane PLANE0, a read command P1, RD_CMD for the second plane PLANE1, a read command P2, RD_CMD for the third plane PLANE2, and a read command P3, RD_CMD for the fourth plane PLANE3 may be sequentially input. Thus, data that is sequentially stored in the four planes PLANE0, PLANE1, PLANE2, and PLANE3 that are included in the memory device 150 may be read into the respective page buffers (CELL→PB0, CELL→PB1, CELL→PB2, and CELL→PB3), and the data that is stored in the plurality of page buffers may be then migrated to the respective cache buffers (PB0→CACHE0, PB1→CACHE1, PB2→CACHE2, and PB3→CACHE3).

In order to check whether the read operation on the first plane PLANE0 has been completed, a status command P0, STATUS_CMD for the first plane PLANE0 may be input. In FIG. 2A, the memory device 150 may check whether the read operation has been completed in the first plane PLANE0 in response to the status command P0, STATUS_CMD for the first plane PLANE0 and may transfer the check result to the controller 130. Therefore, the controller 130 may transfer an output command P0, OUT_CMD for the first plane PLANE0 to the memory device 150. When the read operation in the first plane PLANE0 has not been completed at the point of time at which the status command P0, STATUS_CMD for the first plane PLANE0 is input, the status command P0, STATUS_CMD for the first plane PLANE0 may be repeatedly input.

The memory device 150 may start an operation of copying the data that is stored in the cache buffer of the first plane PLANE0 into the pipe latch (CACHE0→P_LATCH0) in response to the output command P0, OUT_CMD for the first plane PLANE0. The data that is stored in the pipe latch P_LATCH0 may be output to the controller 130 (P0 DATA OUT). At this time, the reason why there is a time difference tST0 between the point of time at which the output command P0, OUT_CMD for the first plane PLANE0 is input and the point of time at which the data is output to the controller 130 from the pipe latch P_LATCH0 is because the time that is required for resetting the pipe latch P_LATCH0 and the time that is required for copying the data of the cache buffer CACHE0 into the pipe latch P_LATCH0 are necessary when the output command P0, OUT_CMD for the first plane PLANE0 is input.

When the data that is read from the first plane PLANE0 is completely output (P0 DATA OUT), a status command P1, STATUS_CMD for the second plane PLANE1 may be input. Since the read operation on the second plane PLANE1 has been completed while the data that is read from the first plane PLANE0 is output (P0 DATA OUT), the memory device 150 may check whether the read operation in the second plane PLANE1 has been completed in response to the status command P1, STATUS_CMD for the second plane PLANE1 and may transfer the check result to the controller 130. Therefore, the controller 130 may transfer an output command P1, OUT_CMD for the second plane PLANE1 to the memory device 150.

The memory device 150 may start an operation of copying the data that is stored in the cache buffer of the second plane PLANE1 into the pipe latch (CACHE1→P_LATCH0) in response to the output command P1, OUT_CMD for the second plane PLANE1. The data that is stored in the pipe latch P_LATCH0 may be output to the controller 130 (P1 DATA OUT). At this time, the reason why there is a difference tST1 between the point of time at which the output command P1, OUT_CMD for the second plane PLANE1 is input and the point of time at which the data is output to the controller 130 from the pipe latch P_LATCH0 is because the time that is required for resetting the pipe latch P_LATCH0 and the time that is required for copying the data of the cache buffer CACHE1 into the pipe latch P_LATCH0 are necessary when the output command P1, OUT_CMD for the second plane PLANE1 is input.

When the data that is read from the second plane PLANE1 is completely output (P1 DATA OUT), a status command P2, STATUS_CMD for the third plane PLANE2 may be input. Since the read operation on the third plane PLANE2 has been completed while the data that is read from the first plane PLANE0 is output (P0 DATA OUT), the memory device 150 may check whether the read operation in the second plane PLANE2 has been completed in response to the status command P2, STATUS_CMD for the third plane PLANE2 and may transfer the check result to the controller 130. Therefore, the controller 130 may transfer an output command P2, OUT_CMD for the third plane PLANE2 to the memory device 150.

The memory device 150 may start an operation of copying the data that is stored in the cache buffer of the third plane PLANE2 into the pipe latch (CACHE2→P_LATCH0) in response to the output command P2, OUT_CMD for the third plane PLANE2. The data that is stored in the pipe latch P_LATCH0 may be output to the controller 130 (P2 DATA OUT). At this time, the reason why there is a difference tST2 between the point of time at which the output command P2, OUT_CMD for the third plane PLANE2 is input and the point of time at which the data is output to the controller 130 from the pipe latch P_LATCH0 is because the time that is required for resetting the pipe latch P_LATCH0 and the time that is required for copying the data of the cache buffer CACHE2 into the pipe latch P_LATCH0 are necessary when the output command P2, OUT_CMD for the third plane PLANE2 is input.

When the data that is read from the third plane PLANE2 is completely output (P2 DATA OUT), a status command P3, STATUS_CMD for the fourth plane PLANE3 may be input. Since the read operation on the fourth plane PLANE3 has been completed while the data that is read from the first plane PLANE0 is output (P0 DATA OUT), the memory device 150 may check whether the read operation in the fourth plane PLANE3 has been completed in response to the status command P3, STATUS_CMD for the fourth plane PLANE3 and may transfer the check result to the controller 130. Therefore, the controller 130 may transfer an output command P3, OUT_CMD for the fourth plane PLANE3 to the memory device 150.

The memory device 150 may start an operation of copying the data that is stored in the cache buffer of the fourth plane PLANE3 into the pipe latch (CACHE3→P_LATCH0) in response to the output command P3, OUT_CMD for the fourth plane PLANE3. The data that is stored in the pipe latch P_LATCH0 may be output to the controller 130 (P3 DATA OUT). At this time, the reason why there is a difference tST3 between the point of time at which the output command P3, OUT_CMD for the fourth plane PLANE3 is input and the point of time at which the data is output to the controller 130 from the pipe latch P_LATCH0 is because the time that is required for resetting the pipe latch P_LATCH0 and the time that is required for copying the data of the cache buffer CACHE3 into the pipe latch P_LATCH0 are necessary when the output command P3, OUT_CMD for the fourth plane PLANE3 is input.

For reference, when the data that is read from the first plane PLANE0 is completely output (P0 DATA OUT), the read command P0, RD_CMD for the first plane PLANE0 may be input again, independent from whether the status commands P1, STATUS_CMD, P2, STATUS_CMD, and P3, STATUS_CMD for the other planes PLANE1, PLANE2, and PLANE3 are input. Therefore, the operation (CELL→PB0) of reading the data that is stored in the first plane PLANE0 into the page buffer and the operation (PB0→CACHE0) of migrating the data that is stored in the page buffer to the cache buffer may be performed again.

Furthermore, when the data that is read from the second plane PLANE1 is completely output (P1 DATA OUT), the read command P1, RD_CMD for the second plane PLANE1 may be input again, independent from whether the status commands P0, STATUS_CMD, P2, STATUS_CMD, and P3, STATUS_CMD for the other planes PLANE0, PLANE2, and PLANE3 are input. Therefore, the operation (CELL→PB1) of reading the data that is stored in the second plane PLANE1 into the page buffer and the operation (PB1→CACHE1) of migrating the data that is stored in the page buffer to the cache buffer may be performed again.

Similarly, when the data that is read from the third plane PLANE2 is completely output (P2 DATA OUT), the read command P2, RD_CMD for the third plane PLANE2 may be input again, independent from whether the status commands P0, STATUS_CMD, P1, STATUS_CMD, and P3, STATUS_CMD for the other planes PLANE0, PLANE1, and PLANE3 are input. Therefore, the operation (CELL→PB2) of reading the data that is stored in the third plane PLANE2 into the page buffer and the operation (PB2→CACHE2) of migrating the data that is stored in the page buffer to the cache buffer may be performed again.

FIG. 2B is a timing diagram illustrating an operation, indicated by a dotted box represented by reference numeral '200' in FIG. 2A, in more detail.

In FIG. 2B, the operation of outputting first data that is read from the first plane PLANE0 of the memory device 150 (P0 DATA OUT) and the operation of outputting second data that is read from the second plane PLANE1 of the memory device 150 (P1 DATA OUT) are illustrated in more detail than in FIG. 2A.

In particular, FIG. 2B is based on the assumption that data that is stored in the cache buffer CACHE0, CACHE1, CACHE2, or CACHE3 is split and then the split data is sequentially transmitted to the pipe latch P_LATCH0, considering that the size of the pipe latch P_LATCH0 is smaller than that of the cache buffer CACHE0, CACHE1, CACHE2, or CACHE3 that is included in the memory device 150 when the memory device 150 is actually mounted. Furthermore, FIG. 2B is based on the assumption that the pipe latch P_LATCH0 includes a plurality of sub pipe latches P_LATCH0_0, P_LATCH0_1, P_LATCH0_2, and P_LATCH0_3 that operate in parallel to one another, considering that two or more sub pipe latches that operate in parallel between the pipe latch P_LATCH0 and a data pad DQ are included in the pipe latch P_LATCH0 when the memory device 150 is actually mounted.

For example, it may be assumed that the pipe latch P_LATCH0 includes four sub pipe latches P_LATCH0_0, P_LATCH0_1, P_LATCH0_2, and P_LATCH0_3, the size of the data that is stored in the cache buffer CACHE0, CACHE1, CACHE2, or CACHE3 is 4 kByte, and the size of data that is processed at a certain time by the sub pipe latches P_LATCH0_0, P_LATCH0_1, P_LATCH0_2, and P_LATCH0_3 is 512 Byte. In this case, the data of 4 kByte, stored in the cache buffer CACHE0, CACHE1, CACHE2, or CACHE3, may be split into eight data D0, D1, D2, D3, D4, D5, D6, and D7, each having a size of 512 Byte, and then the split data is sequentially output through one data pad DQ via the four sub pipe latches P_LATCH0_0, P_LATCH0_1, P_LATCH0_2, and P_LATCH0_3. For reference, the numbers that are used in the present embodiment (i.e. 4 kByte, 512 Byte, four, and one) are only values that are suggested as examples for convenience of description. In reality, the numbers may be set to other values depending on the type of the memory device or a designer's selection.

Referring to FIGS. 2A and 2B, the first ⅛ data D0 read from the first plane PLANE0 of the memory device 150 may be output to the data pad DQ through the first sub pipe latch P_LATCH0_0, the second ⅛ data D1 that is read from the first plane PLANE0 of the memory device 150 may be output to the data pad DQ through the second sub pipe latch P_LATCH0_1, the third ⅛ data D2 that is read from the first plane PLANE0 of the memory device 150 may be output to the data pad DQ through the third sub pipe latch P_LATCH0_2, and then the fourth ⅛ data D3 that is read from the first plane PLANE0 of the memory device 150 may be output to the data pad DQ through the fourth sub pipe latch P_LATCH0_3. Subsequently, the fifth ⅛ data D4 that is read from the first plane PLANE0 of the memory device 150 may be output to the data pad DQ through the first sub pipe latch P_LATCH0_0 again, the sixth ⅛ data D5 that is read from the first plane PLANE0 of the memory device 150 may be output to the data pad DQ through the second sub pipe latch P_LATCH0_1 again, the seventh ⅛ data D6 that is read from the first plane PLANE0 of the memory device 150 may be output to the data pad DQ through the third sub pipe latch P_LATCH0_2 again, and then the eighth ⅛ data D7 that is read from the first plane PLANE0 of the memory device 150 may be output to the data pad DQ through the fourth sub pipe latch P_LATCH0_3 again.

When the first data that is read from the first plane PLANE0, included in the memory device 150, is completely output (P0 DATA OUT, D0 to D7), the output command P1, OUT_CMD may be input after the status command P1, STATUS_CMD for the second plane PLANE1.

At the point of time at which the output command P1, OUT_CMD for the second plane PLANE1 is input, the data D4, D5, D6, and D7, which have been stored when the first data that is read from the first plane PLANE0 were output (P0 DATA OUT, D0~D7), may still remain in the pipe latch P_LATCH0 that is included in the memory device 150. Therefore, the memory device 150 may first perform a pipe latch reset operation of resetting the pipe latch P_LATCH0 in response to the input of the output command P1, OUT_CMD for the second plane PLANE1 and then may perform an operation (CACHE1→P_LATCH0) of sequentially copying the data that is stored in the cache buffer P2, CACHE1 of the second plane PLANE1 into the pipe latch P_LATCH0.

Even when the second data that is read from the second plane PLANE1 is output to the data pad DQ through the pipe latch P_LATCH0 (P1 DATA OUT), the memory device 150 may split the second data into eight data D0, D1, D2, D3, D4, D5, D6, and D7, like the first data (P0 DATA OUT), and then sequentially output the data D0, D1, D2, D3, D4, D5, D6, and D7 through one data pad DQ via four sub pipe latches P_LATCH0_0, P_LATCH0_1, P_LATCH0_2, and P_LATCH0_3.

As described above, when data is read in an interleaving manner from the plurality of planes PLANE0, PLANE1, PLANE2, and PLANE3 that are included in the memory device 150, there are inevitably differences tST0, tST1, tST2, and tST3 between the point of time at which the output command OUT_CMD is input and the point of time at which the data is output to the controller 130 from the pipe latch P_LATCH0, due to the operation of the memory device 150 to reset the pipe latch P_LATCH0 that is shared by the plurality of planes PLANE0, PLANE1, PLANE2, and PLANE3.

Figure 3:
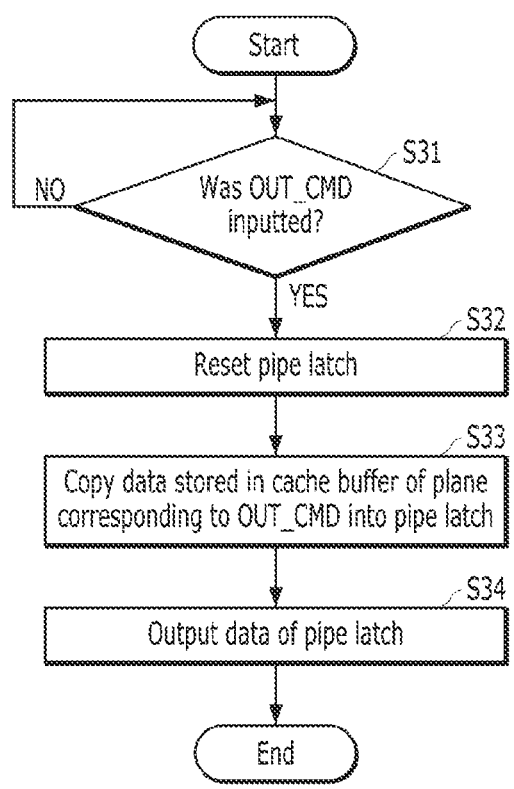
FIG. 3 is a flowchart for describing an example of the read operation performed by the memory device in accordance with the present embodiment.

FIG. 3 is a flowchart for describing an example of the read operation performed by the memory device in accordance with the present embodiment.

FIG. 3 shows that, as described with reference to FIGS. 2A and 2B, after the memory device 150 receives the read command RD_CMD from the controller 130 and performs a read operation, the memory device 150 does not perform any operation but waits until the output command OUT_CMD is input.

Specifically, as described with reference to FIGS. 2A and 2B, the plurality of planes PLANE0, PLANE1, PLANE2, and PLANE3 of the memory device 150 may perform read operations in parallel to one another, in response to the read commands RD_CMD that are received from the controller 130. At this time, when the operation of storing the data, read from the respective planes PLANE0, PLANE1, PLANE2, and PLANE3, in the cache buffers CACHE0, CACHE1, CACHE2, and CACHE3 is completed, the memory device 150 may wait until the output command OUT_CMD is input. That is, the memory device 150 may check whether the output command OUT_CMD is input, in step S31. In this case, when the output command OUT_CMD is not input (NO in step S31), the memory device 150 may wait and might not perform any operation. For example, FIGS. 2A and 2B show that the memory device 150 does not perform any operation but waits until the output command P1, OUT_CMD is input after the read operation on the second plane PLANE1 is completed in response to the read command P1, RD_CMD.

When the output command OUT_CMD is input (YES in step S31), the memory device 150 may reset the pipe latch P_LATCH in step S32. For example, the memory device 150 may reset the pipe latch P_LATCH0 in response to the input of the output command P1, OUT_CMD, corresponding to the second plane PLANE1.

After step S32, the memory device 150 may copy, into the pipe latch P_LATCH, the data that is stored in the cache buffer CACHE of the plane, corresponding to the output command OUT_CMD, in step S33. For example, the memory device 150 may perform an operation of copying the data of the second plane PLANE1 into the pipe latch P_LATCH0 after the operation of resetting the pipe latch P_LATCH0 is completed.

After step S33, the memory device 150 may output the data that is stored in the pipe latch P_LATCH to the controller 130 in step S34. For example, after the data is stored in the pipe latch P_LATCH0, the memory device 150 may output the stored data to the controller 130.

Figure 4:
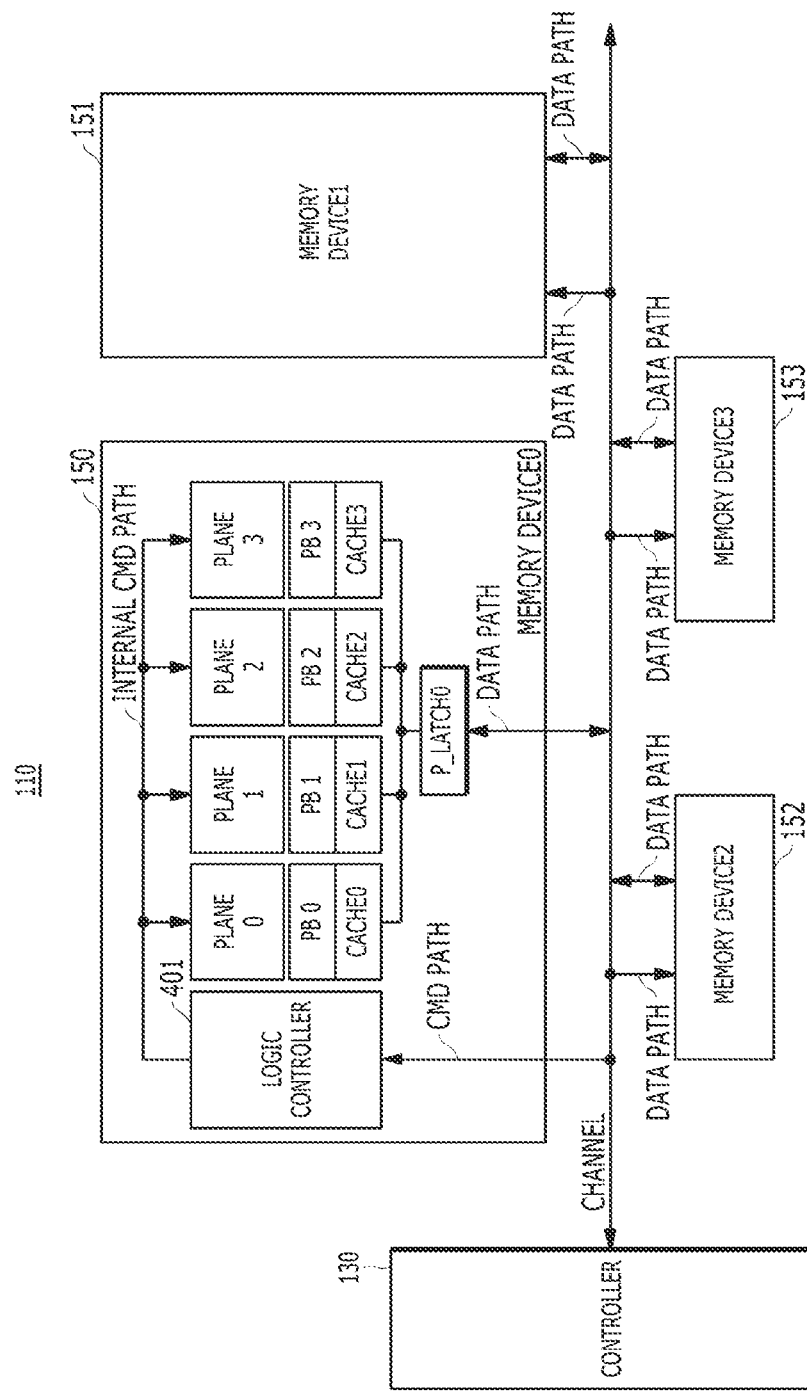
FIG. 4 is a diagram for describing the detailed configuration of the memory device in accordance with the present embodiment.

FIG. 4 is a diagram for describing the detailed configuration of the memory device in accordance with the present embodiment.

FIG. 4 illustrates the detailed configuration of the first memory device 150, among the plurality of memory devices 150, 151, 152, and 153, in accordance with the embodiment described with reference to FIGS. 1A and 1B. For reference, FIG. 4 illustrates only the detailed configuration of the first memory device 150. However, this is only an example for convenience of description, and the other memory devices 151, 152, and 153 may each have the same configuration as the first memory device 150. Therefore, the operation, corresponding to the first memory device 150 in the following descriptions, may be applied to each of the other memory devices 151, 152, and 153.

Specifically, the memory device 150 may include the plurality of planes PLANE0, PLANE1, PLANE2, and PLANE3, the pipe latch P_LATCH0, and a logic controller 401.

The plurality of planes PLANE0, PLANE1, PLANE2, and PLANE3 may each input/output a plurality of data in units of pages. The plurality of planes PLANE0, PLANE1, PLANE2, and PLANE3 may include a plurality of page buffers PB0, PB1, PB2, and PB3 and a plurality of cache buffers CACHE0, CACHE1, CACHE2, and CACHE3, respectively.

The pipe latch P_LATCH0 may perform read operations on one or more planes of the plurality of planes PLANE0, PLANE1, PLANE2, and PLANE3 in response to one or more read commands, respectively, and the pipe latch P_LATCH0 may receive data from any one plane of the one or more planes in which the read operations have been completed and store the received data therein.

In response to an output command that is received after the one or more read commands are received, the logic controller 401 may compare first plane information, indicating a plane, among the plurality of planes PLANE0, PLANE1, PLANE2, and PLANE3, corresponding to the data of the pipe latch P_LATCH0, to second plane information, indicating a plane, among the plurality of planes PLANE0, PLANE1, PLANE2, and PLANE3, corresponding to the output command, and may selectively output the data of the pipe latch P_LATCH0 according to the comparison result.

The logic controller 401 may perform a read operation on each of one or more planes, among the plurality of planes PLANE0, PLANE1, PLANE2, and PLANE3, corresponding to one or more read commands.

In an embodiment, when a plurality of read commands are read commands for reading one data from the plurality of planes PLANE0, PLANE1, PLANE2, and PLANE3, respectively, the logic controller 401 may perform read operations on the respective planes PLANE0, PLANE1, PLANE2, and PLANE3, such that a plurality of data that is stored in the respective planes PLANE0, PLANE1, PLANE2, and PLANE3 are read into the plurality of page buffers PB0, PB1, PB2, and PB3, respectively, and the plurality of data that is stored in the respective page buffers PB0, PB1, PB2, and PB3 are migrated to the plurality of cache buffers CACHE0, CACHE1, CACHE2, and CACHE3, respectively.

When the read operation on at least one plane of the plurality of planes PLANE0, PLANE1, PLANE2, and PLANE3 is completed, or data is completely stored in the cache buffer (one of CACHE<0:3>) that is included in at least one plane of the plurality of planes PLANE0, PLANE1, PLANE2, and PLANE3, the logic controller 401 may receive the data from any one plane of the one or more planes and may store the received data in the pipe latch P_LATCH0.

The logic controller 401 may copy, into the pipe latch P_LATCH0, the data of the cache buffer (one of CACHE<0: 3>) that is included in any one plane, among the plurality of planes PLANE0, PLANE1, PLANE2, and PLANE3, which corresponds to any one read command and on which the read operation has been completed.

At this time, the logic controller 401 may continuously perform the operation of reading data from one or more planes, corresponding to one or more read commands, and storing the read data in the corresponding cache buffer (one of CACHE<0:3>), i.e. a read operation on a plane, corresponding to a read command, regardless of whether to start the operation of receiving data from any one plane of one or more planes and storing the read data in the pipe latch P_LATCH0.

In an embodiment, when two read commands that are sequentially input are commands for reading one data from the first and second planes PLANE0 and PLANE1, respectively, the logic controller 401 may first perform a read operation on the first plane PLANE0 and then perform a read operation on the second plane PLANE1. In this case, the logic controller 401 may check whether the read operation on the first plane PLANE0 has been first completed and may start the operation of copying the data that is stored in the cache buffer CACHE<0> of the first plane PLANE0 into the pipe latch P_LATCH0. However, the logic controller 401 may continuously perform the read operation on the second plane PLANE1, regardless of whether to start the operation of copying the data that is stored in the cache buffer CACHE<0> of the first plane PLANE0 into the pipe latch P_LATCH0. When there are no more read commands to be processed after the read operation on the second plane PLANE1 is completed, the logic controller 401 may end the read operation.

After completing the operation of copying, into the pipe latch P_LATCH0, the data of the cache buffer (one of CACHE<0:3>) that is included in any one plane of the plurality of planes PLANE0, PLANE1, PLANE2, and PLANE3, the logic controller 401 may start the operation of comparing the first plane information and the second plane information in response to the received output command and selectively outputting the data of the pipe latch P_LATCH0 according to the comparison result.

Specifically, the logic controller 401 may compare the first plane information, indicating from which plane of the plurality of planes PLANE0, PLANE1, PLANE2, and PLANE3 the data that is stored in the pipe latch P_LATCH0 has been read, to the second plane information, indicating the plane, corresponding to the output command.

When the comparison result indicates that the first plane information and the second plane information are equal to each other, the logic controller 401 may output the data that is stored in the pipe latch P_LATCH0 to the controller 130 as it is.

When the comparison result indicates that the first plane information and the second plane information are not equal to each other, the logic controller 401 may receive the data that is read from the plane, among the plurality of planes PLANE0, PLANE1, PLANE2, and PLANE3, corresponding to the output command (i.e. the data that is stored in the cache buffer (one of CACHE<0:3>) of the plane, corresponding to the output command), store the received data in the pipe latch P_LATCH0, and then output the data of the pipe latch P_LATCH0 to the controller 130.

Figure 5:
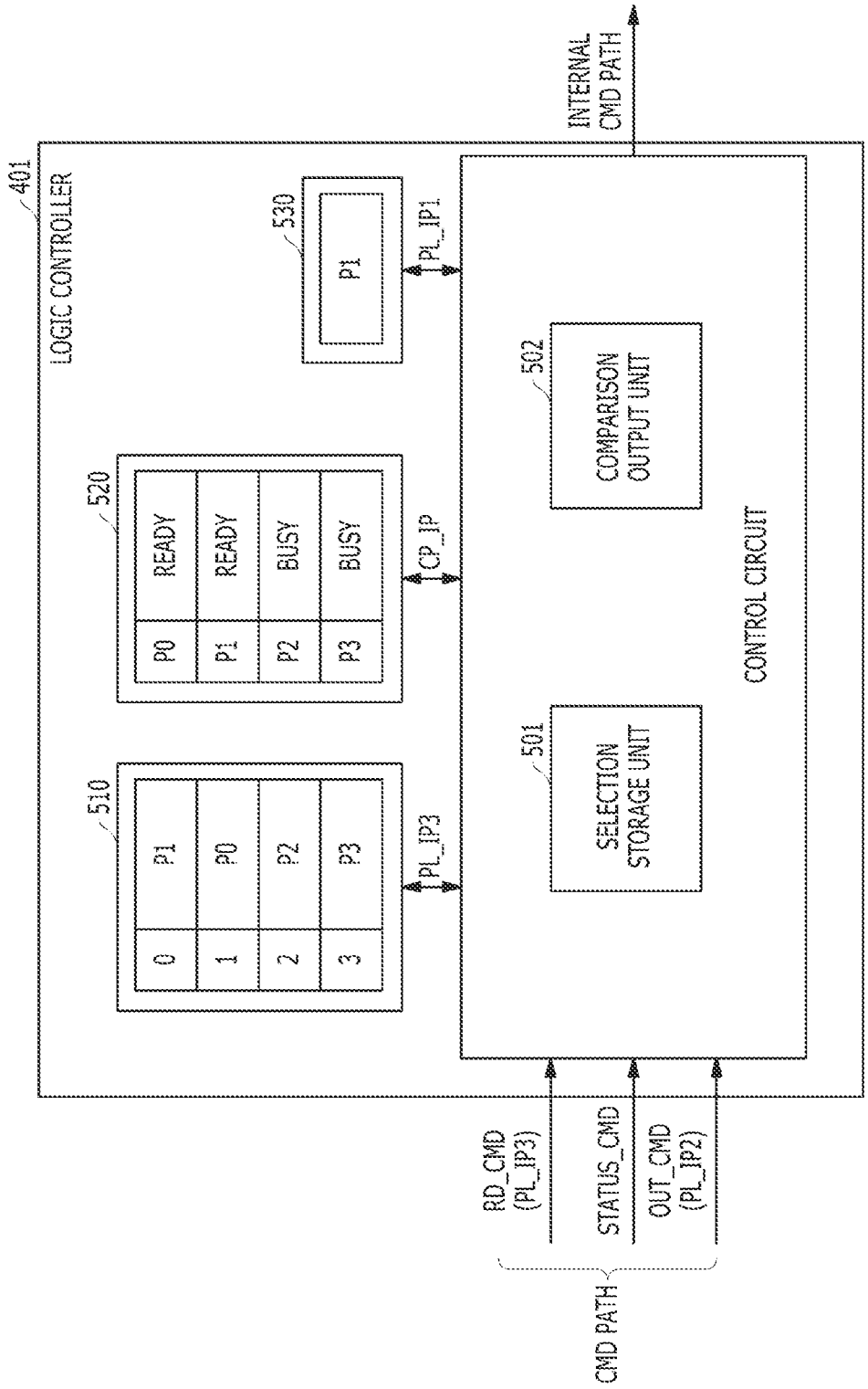
FIG. 5 is a diagram for describing the detailed configuration of a logic controller among components of the memory device disclosed in FIG. 4.

FIG. 5 is a diagram for describing the detailed configuration of the logic controller among the components of the memory device illustrated in FIG. 4.

FIG. 5 illustrates the detailed configuration of the logic controller 401 among the components of the first memory device 150 illustrated in detail in FIG. 4. For reference, FIG. 5 illustrates only the detailed configuration of the logic controller 401 that is included in the first memory device 150. However, this is only an example for convenience of description, and the other memory devices 151, 152, and 153 may each include the logic controller 401 having the same configuration as that of the first memory device 150. Therefore, an operation, corresponding to the first memory device 150 in the following descriptions, may be applied to each of the other memory devices 151, 152, and 153.

First, the logic controller 401 may perform read operations on one or more planes of the plurality of planes PLANE0, PLANE1, PLANE2, and PLANE3 in response to one or more read commands, respectively, and may copy, into the pipe latch P_LATCH0, data of the cache buffer (one of CACHE<0:3>) that is included in any one plane of the one or more planes on which the read operations have been completed.

In response to the output command OUT_CMD that is received after the one or more read commands RD_CMD are received, the logic controller 401 may compare first plane information PL_IP1, indicating the plane, among the plurality of planes PLANE0, PLANE1, PLANE2, and PLANE3, corresponding to the data of the pipe latch P_LATCH0, to second plane information PL_IP2, indicating the plane, among the plurality of planes PLANE0, PLANE1, PLANE2, and PLANE3, corresponding to the output command OUT_CMD, and may selectively output the data of the pipe latch P_LATCH0 according to the comparison result.

Specifically, the logic controller 401 may include a plane queue 510, a ready register 520, a status register 530, and a control circuit 500. The control circuit 500 may include a selection storage unit 501 and a comparison output unit 502.

The control circuit 500 that is included in the logic controller 401 may control overall operations of the logic controller 401. The control circuit 500 may control operations of the plane queue 510, the ready register 520, and the status register 530 in response to the read command RD_CMD, the status command STATUS_CMD, and the output command OUT_CMD, which are received from the controller 130 through a command path CMD PATH. Furthermore, the control circuit 500 may generate a control signal for controlling the operations of the plurality of planes PLANE0, PLANE1, PLANE2, and PLANE3 and output the control signal to an internal command path INTERNAL CMD PATH, in response to the read command RD_CMD, the status command STATUS_CMD, and the output command OUT_CMD, which are received from the controller 130 through the command path CMD PATH. That is, the control circuit 500 may control the operations of the plane queue 510, the ready register 520, the status register 530, and the plurality of planes PLANE0, PLANE1, PLANE2, and PLANE3 through the operations of the selection storage unit 501 and the comparison output unit 502, which are included therein.

The plane queue 510 may store third plane information PL_IP3, indicating a plane, among the plurality of planes PLANE0, PLANE1, PLANE2, and PLANE3, corresponding to the read command RD_CMD. When the plurality of read commands RD_CMD are sequentially received from the controller 130, one or more pieces of third plane information PL_IP3 may be sequentially stored in the plane queue 510 according to the order in which the plurality of read commands RD_CMD are received.

In an embodiment, the read command RD_CMD that is received for the first time may correspond to the second plane PLANE1, the read command RD_CMD that is received for the second time may correspond to the first plane PLANE0, the read command RD_CMD that is received for the third time may correspond to the third plane PLANE2, and the read command RD_CMD that is received for the fourth time may correspond to the fourth plane PLANE3. In this case, the third plane information PL_IP3, P1, indicating the second plane PLANE1, may be stored in a first slot 0 of the plane queue 510, the third plane information PL_IP3, P0, indicating the first plane PLANE0, may be stored in a second slot 1 of the plane queue 510, the third plane information PL_IP3, P2, indicating the third plane PLANE2, may be stored in a third slot 2 of the plane queue 510, and the third plane information PL_IP3, P3, indicating the fourth plane PLANE3, may be stored in a fourth slot 3 of the plane queue 510.

After the output command OUT_CMD is received from the controller 130, the plane queue 510 may remove a value, among the plurality of pieces of third plane information PL_IP3 that are stored therein, corresponding to the second plane information PL_IP2, indicating the plane that corresponds to the output command OUT_CMD. In this way, the third plane information PL_IP3 that is removed from the plane queue 510 may be regenerated in response to the received read command RD_CMD.

For reference, the operation of storing the third plane information PL_IP3 in the plane queue 510 may be performed by the control circuit 500.

The number of storage spaces that are included in the plane queue 510 may correspond to the number of the plurality of planes PLANE0, PLANE1, PLANE2, and PLANE3.

In an embodiment, since four planes PLANE0, PLANE1, PLANE2, and PLANE3 are included in the memory device 150, four storage spaces may be included in the plane queue 510.

The status register 530 may store the first plane information PL_IP1. At this time, the first plane information PL_IP1 may indicate any one piece of information, indicating any one plane, selected from the one or more pieces of third plane information PL_IP3 that is stored in the plane queue 510.

In an embodiment, when the second plane PLANE1 is selected among the plurality of planes PLANE0, PLANE1, PLANE2, and PLANE3, the first plane information PL_IP1 may have the same value as the third plane information PL_IP3, indicating the second plane PLANE1.

For reference, the operation of storing the first plane information PL_IP1 in the status register 530 may be performed by the control circuit 500.

The ready register 520 may store completion information CP_IP, indicating whether the read operation on the plane, among the plurality of planes PLANE0, PLANE1, PLANE2, and PLANE3, corresponding to the read command RD_CMD, has been completed.

In an embodiment, when the plurality of read commands RD_CMD are read commands for reading one data from the plurality of planes PLANE0, PLANE1, PLANE2, and PLANE3, respectively, and the read operations on the first and second planes PLANE0 and PLANE1 have been completed, but the read operations on the third and fourth planes PLANE2 and PLANE3 have not been completed, the completion information CP_IP on the first and second planes PLANE0 and PLANE1 may have a ready value READY, and the completion information CP_IP on the third and fourth planes PLANE2 and PLANE3 may have a busy value BUSY.

For reference, the operation of storing the completion information CP_IP in the ready register 520 may be performed by the control circuit 500.

The logic controller 401 may generate the completion information CP_IP in response to the completions of the read operations on the respective planes PLANE0, PLANE1, PLANE2, and PLANE3.

The logic controller 401 may store, in the ready register 520, the completion information CP_IP that is generated in response to the completions of the read operations on the respective planes PLANE0, PLANE1, PLANE2, and PLANE3.

In an embodiment, when the read operations on the four planes PLANE0, PLANE1, PLANE2, and PLANE3 that are included in the memory device 150 are started in response to the plurality of read commands RD_CMD, respectively, the completion information CP_IP on each of the four planes PLANE0, PLANE1, PLANE2, and PLANE3 may be set to the busy value BUSY. Then, the completion information CP_IP may be changed from the busy value BUSY to the ready value READY according to the order in which the read operations of the four planes PLANE0, PLANE1, PLANE2, and PLANE3 are completed. For example, the completion information CP_IP on the second plane PLANE1 may be changed from the busy value BUSY to the ready value READY, the completion information CP_IP on the first plane PLANE0 may be then changed from the busy value BUSY to the ready value READY, the completion information CP_IP on the third plane PLANE2 may be then changed from the busy value BUSY to the ready value READY, and the completion information CP_IP on the fourth plane PLANE3 may be then changed from the busy value BUSY to the ready value READY.

The logic controller 401 may transfer the completion information CP_IP that is stored in the ready register 520 to the controller 130 in response to the status command STATUS_CMD that is received between the point of time at which the read command RD_CMD is received from the controller 130 and the point of time at which the output command OUT_CMD is received from the controller 130.

The logic controller 401 may generate the completion information CP_IP in response to whether the read operations have been completed in the respective planes PLANE0, PLANE1, PLANE2, and PLANE3, and then transmit the generated completion information CP_IP as a response to the status command STATUS_CMD to the controller 130. Therefore, the controller 130 may identify a plane, among the plurality of planes PLANE0, PLANE1, PLANE2, and PLANE3, on which the read operation has been completed through the status command STATUS_CMD. In this way, the controller 130 may identify the plane on which the read operation has been completed. Thus, the controller 130 may generate the output command OUT_CMD only for the plane, among the plurality of planes PLANE0, PLANE1, PLANE2, and PLANE3, on which the read operation has been completed. Therefore, the read operation on the plane that is indicated by the second plane information PL_IP2, corresponding to the output command OUT_CMD, may always be completed.

In response to the completion information CP_IP, the selection storage unit 501 may select the third plane information PL_IP3 that is stored in the plane queue 510 and any one plane, among the plurality of planes PLANE0, PLANE1, PLANE2, and PLANE3, and may store data that is read from the selected plane in the pipe latch P_LATCH0, the completion information CP_IP indicating whether the read operations on one or more planes, among the plurality of planes PLANE0, PLANE1, PLANE2, and PLANE3, corresponding to one or more read commands RD_CMD, have been completed.

The selection storage unit 501 may check the completion information CP_IP, corresponding to the plurality of planes PLANE0, PLANE1, PLANE2, and PLANE3, according to the order in which the read commands RD_CMD, corresponding to the third plane information PL_IP3 that is stored in the plane queue 510, are received. Afterwards, the selection storage unit 501 may select, as a selected plane, any one plane, among the plurality of planes PLANE0, PLANE1, PLANE2, and PLANE3, which has first received the read command RD_CMD and on which the read operation has been completed according to the check result. Then, the selection storage unit 501 may store data that is read from the selected plane in the pipe latch P_LATCH0.

The selection storage unit 501 may select any one plane, among the plurality of planes PLANE0, PLANE1, PLANE2, and PLANE3, in response to the completion information CP_IP that is stored in the ready register 520 and the third plane information PL_IP3 that is stored in the plane queue 510 and may generate the first plane information PL_IP1, indicating the selected plane.

The selection storage unit 501 may generate the first plane information PL_IP1 and store the generated information in the status register 530. The selection storage unit 501 may store, in the pipe latch P_LATCH0, the data that is read from the selected plane that is indicated by the first plane information PL_IP1 that is stored in the status register 530.

The selection storage unit 501 may copy, into the pipe latch P_LATCH0, the data that is stored in the cache buffer (one of CACHE<0:3>) of the selected plane, among the plurality of cache buffers CACHE0, CACHE1, CACHE2, and CACHE3, included in the respective planes PLANE0, PLANE1, PLANE2, and PLANE3, regardless of whether the output command OUT_CMD is received after one or more read commands RD_CMD are received.

The selection storage unit 501 may copy, into the pipe latch P_LATCH0, the data that is stored in the cache buffer (one of CACHE<0:3>) of the selected plane that is indicated by the first plane information PL_IP1 that is stored in the status register 530, regardless of whether the output command OUT_CMD is received after one or more read commands RD_CMD are received.

In an embodiment, the selection storage unit 501 may select the second plane PLANE1, among the plurality of planes PLANE0, PLANE1, PLANE2, and PLANE3, in response to the completion information CP_IP that is stored in the ready register 520 and the third plane information PL_IP3 that is stored in the plane queue 510, and store data that is read from the selected second plane PLANE1 in the pipe latch P_LATCH0.

In an embodiment, according to the order of the read commands RD_CMD, corresponding to the plurality of pieces of third plane information PL_IP3, stored in the plane queue 510, the selection storage unit 501 may check the completion information CP_IP, corresponding to the second plane PLANE1, received from the ready register 520, then check the completion information CP_IP, corresponding to the first plane PLANE0, received from the ready register 520, then check the completion information CP_IP, corresponding to the third plane PLANE2, received from the ready register 520, and then check the completion information, corresponding to the fourth plane PLANE3, received from the ready register 520. FIG. 5 shows that the completion information CP_IP corresponding to the second plane PLANE1, checked from the ready register 520 according to the order of the read commands RD_CMD, corresponding to the plurality of pieces of third plane information PL_IP3 that are stored in the plane queue 510, has the ready value READY. Therefore, in FIG. 5, the selection storage unit 501 may check the completion information CP_IP, corresponding to the second plane PLANE1, received from the ready register 520, and may set the second plane PLANE1 to the selected plane. Thus, the selection storage unit 501 might not check, from the ready register 520, the completion information CP_IP, corresponding to the other planes PLANE0, PLANE2, and PLANE3.

In an embodiment, the selection storage unit 501 may select the second plane PLANE1, among the plurality of planes PLANE0, PLANE1, PLANE2, and PLANE3, in response to the completion information CP_IP that is stored in the ready register 520 and the third plane information PL_IP3 that is stored in the plane queue 510 and may generate the first plane information PL_IP1, indicating the selected second plane PLANE1. The selection storage unit 501 may generate the first plane information PL_IP1, indicating the second plane PLANE1, and may store the generated information in the status register 530.

In an embodiment, the selection storage unit 501 may store, in the pipe latch P_LATCH0, the data that is read from the second plane PLANE1 that is indicated by the first plane information PL_IP1 that is stored in the status register 530.

In an embodiment, the selection storage unit 501 may copy, into the pipe latch P_LATCH0, the data that is stored in the cache buffer CACHE1 of the second plane PLANE1 that is indicated by the first plane information PL_IP1 that is stored in the status register 530.

The comparison output unit 502 may compare the first plane information PL_IP1, indicating the plane that is selected through the selection storage unit 501, to the second plane information PL_IP2 in response to the output command OUT_CMD that is received after one or more read commands RD_CMD are received. When the first plane information PL_IP1 and the second plane information PL_IP2 are equal to each other, the comparison output unit 502 may output the data of the pipe latch P_LATCH0 to the controller 130.

When the first plane information PL_IP1 that is received from the status register 530 is equal to the second plane information PL_IP2, the comparison output unit 502 may output the data of the pipe latch P_LATCH0 to the controller 130. The first plane information PL_IP1 may indicate any one piece of information, among the plurality of pieces of third plane information PL_IP3 that is stored in the plane queue 510, indicating any one plane that is selected through the selection storage unit 501.

In an embodiment, the third plane information PL_IP3, P1, among the four pieces of third plane information PL_IP3, P0 to P3 stored in the plane queue 510, indicating the second plane PLANE1 that is selected through the selection storage unit 501, may be the first plane information PL_IP1, P1.

The comparison output unit 502 may compare the second plane information PL_IP2, indicating the plane, corresponding to the output command OUT_CMD, received after the one or more read commands RD_CMD are received, to the first plane information PL_IP1 stored in the status register 530. When the second plane information PL_IP2 and the first plane information PL_IP1 are equal to each other, the comparison output unit 502 may output the data that is stored in the pipe latch P_LATCH0 to the controller 130 as it is.

In an embodiment, when the first plane information PL_IP1 that is stored in the status register 530 indicates the second plane PLANE1, the data that is read from the second plane PLANE1 may be already stored in the pipe latch P_LATCH0. In such a state, when the second plane information PL_IP2, corresponding to the output command OUT_CMD, indicates the second plane PLANE1, the comparison output unit 502 may check whether the first plane information PL_IP1 and the second plane information PL_IP2 are equal to each other and may output the data of the pipe latch P_LATCH0 to the controller 130 as it is, because the data that is stored in the pipe latch P_LATCH0 is the data that is read from the second plane PLANE1.

The comparison output unit 502 may compare the second plane information PL_IP2, indicating the plane, corresponding to the output command OUT_CMD, received after the one or more read commands RD_CMD are received, to the first plane information PL_IP1 stored in the status register 530. When the second plane information PL_IP2 and the first plane information PL_IP1 are not equal to each other, the comparison output unit 502 may store the data that is read from the plane, corresponding to the output command OUT_CMD in the pipe latch P_LATCH0, and then output the data that is stored in the pipe latch P_LATCH0 to the controller 130.

In an embodiment, when the first plane information PL_IP1 that is stored in the status register 530 indicates the second plane PLANE1, the data that is read from the second plane PLANE1 may be already stored in the pipe latch P_LATCH0. In such a state, when the second plane information PL_IP2, corresponding to the output command OUT_CMD, indicates the first plane PLANE0, the comparison output unit 502 may check whether the first plane information PL_IP1 and the second plane information PL_IP2 are not equal to each other, reset the pipe latch P_LATCH0, store the data that is read from the first plane PLANE0, corresponding to the output command OUT_CMD, in the pipe latch P_LATCH0, and then output the data that is stored in the pipe latch P_LATCH0, i.e. the data that is read from the first plane PLANE0, to the controller 130.

After performing the operation of comparing the second plane information PL_IP2, indicating the plane, corresponding to the output command OUT_CMD, received after the one or more read commands RD_CMD are received, to the first plane information PL_IP1 that is stored in the status register 530, the comparison output unit 502 may remove the value, corresponding to the second plane information PL_IP2, among the plurality of pieces of third plane information PL_IP3 that is stored in the plane queue 510.

In an embodiment, when the second plane information PL_IP2, corresponding to the output command OUT_CMD, indicates the second plane PLANE1, the comparison output unit 502 may perform the operation of comparing the second plane information PL_IP2, indicating the plane, corresponding to the output command OUT_CMD, received after one or more read commands RD_CMD are received, to the first plane information PL_IP1, among the plurality of pieces of third plane information PL_IP3 that is stored in the plane queue 510, stored in the status register 530, and then remove the value, indicating the second plane PLANE1.

Figure 6A:
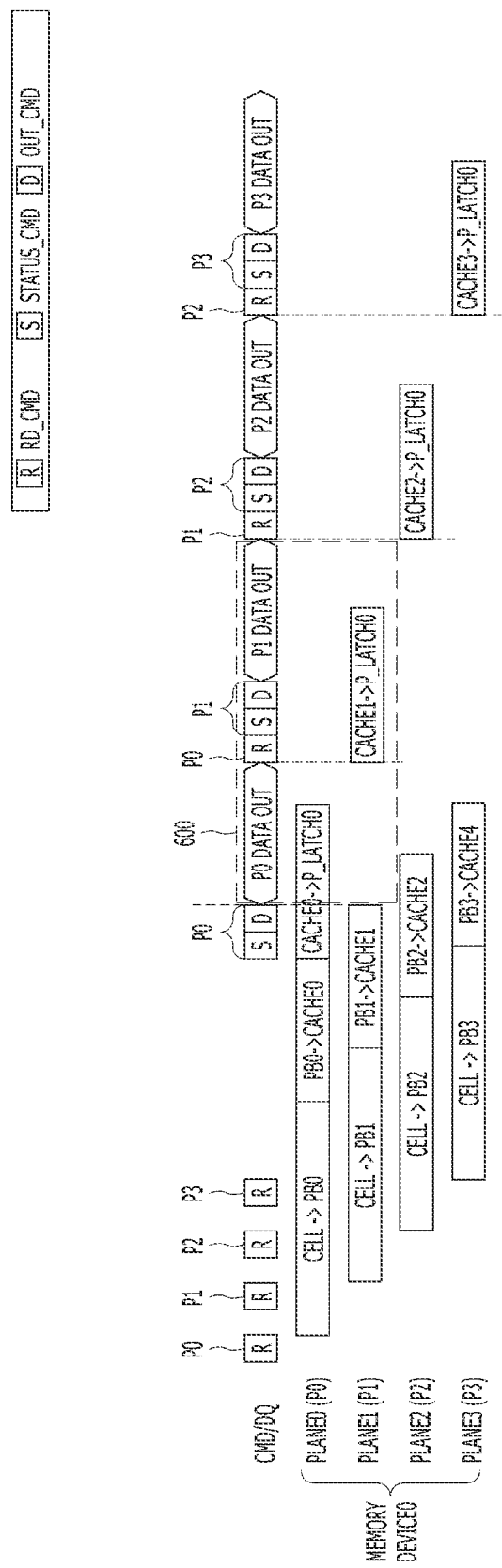
FIGS. 6A and 6B are timing diagrams for describing another example of the read operation performed by the memory device in accordance with the present embodiment.
Figure 6B:
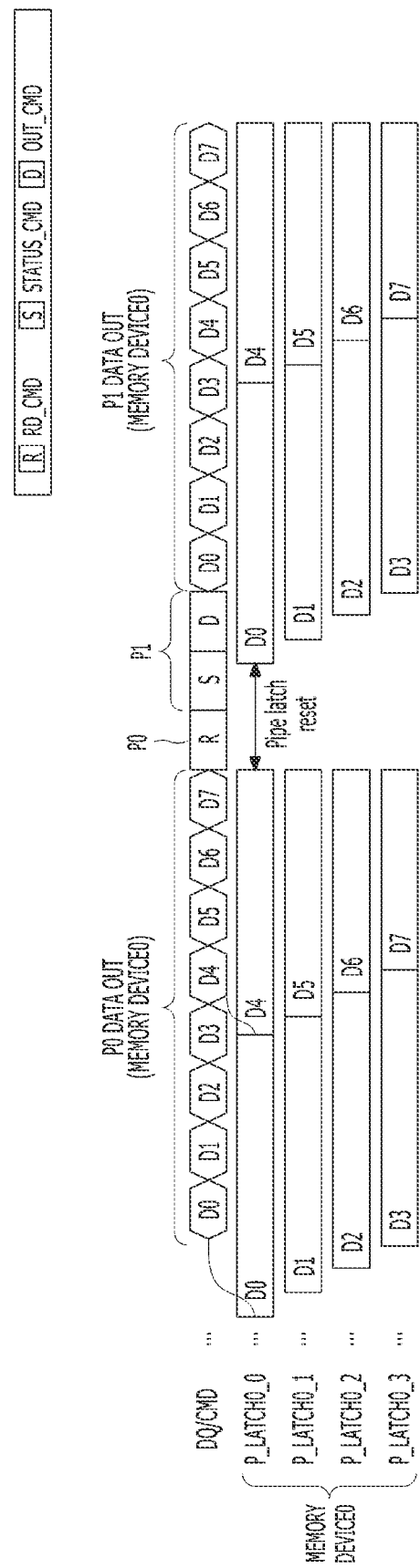

FIGS. 6A and 6B are timing diagrams for describing another example of the read operation performed by the memory device in accordance with the present embodiment.

FIGS. 6A and 6B show how read operations are sequentially performed on the respective planes PLANE0, PLANE1, PLANE2, and PLANE3 that are included in the memory device 150. Hereafter, an operation of the first memory device 150, among the plurality of memory devices 150 to 153, will be described as an operation of a memory device. However, the same type of operation as that of the first memory device 150 may be performed by each of the other memory devices 151 to 153.

Referring to FIG. 6A, the controller 130 may generate a read command RD_CMD, a status command STATUS_CMD, and an output command OUT_CMD in response to a read operation that is requested by the host 102 and may transfer the generated commands to the memory device 150.

The memory device 150 may read data from one or more planes, among the planes PLANE0, PLANE1, PLANE2, and PLANE3, in response to one or more read commands RD_CMD that is received therein. That is, the memory device 150 may read data, stored in any one plane that is selected as a read target, into the corresponding page buffer in response to any one of the received read commands RD_CMD and then migrate the data of the page buffer to the corresponding cache buffer.

In an embodiment, it may be assumed that read requests are sequentially generated for the four planes PLANE0, PLANE1, PLANE2, and PLANE3 that are included in the memory device 150, respectively. That is, as illustrated in FIG. 6A, a read command P0, RD_CMD for the first plane PLANE0, a read command P1, RD_CMD for the second plane PLANE1, a read command P2, RD_CMD for the third plane PLANE2, and a read command P3, RD_CMD for the fourth plane PLANE3 may be sequentially input. Thus, data that is sequentially stored in the four planes PLANE0, PLANE1, PLANE2, and PLANE3 that are included in the memory device 150 may be read into the respective page buffers (CELL→PB0, CELL→PB1, CELL→PB2, and CELL→PB3), and then the data that is stored in the plurality of page buffers may be migrated to the respective cache buffers (PB0→CACHE0, PB1→CACHE1, PB2→CACHE2, and PB3→CACHE3).

The logic controller 401 that is included in the memory device 150 may generate third plane information PL_IP3, indicating to which planes, among the plurality of planes PLANE0, PLANE1, PLANE2, and PLANE3, the sequentially input read commands RD_CMD correspond and may store the third plane information PL_IP3 in the plane queue 510.

In an embodiment, the read command P0, RD_CMD for the first plane PLANE0, the read command P1, RD_CMD for the second plane PLANE1, the read command P2, RD_CMD for the third plane PLANE2, and the read command P3, RD_CMD for the fourth plane PLANE3 may be sequentially input. Thus, the logic controller 401 that is included in the memory device 150 may store the third plane information PL_IP3, corresponding to the first plane PLANE0, in a first slot of the plane queue 510, store the third plane information PL_IP3, corresponding to the second plane PLANE1, in a second slot of the plane queue 510, store the third plane information PL_IP3, corresponding to the third plane PLANE2, in a third slot of the plane queue 510, and store the third plane information PL_IP3, corresponding to the fourth plane PLANE3, in a fourth slot of the plane queue 510.

In response to the status command STATUS_CMD that is received from the controller 130, the memory device 150 may check whether the read operation has been completed in any one plane, among the plurality of planes PLANE0, PLANE1, PLANE2, and PLANE3, selected as the read target, or whether data is stored in the cache buffer of the plane that is selected as the read target, and may transfer the check result to the controller 130.

In order to check whether the read operation on the first plane PLANE0 has been completed, a status command P0, STATUS_CMD for the first plane PLANE0 may be input. In FIG. 6A, the memory device 150 may check whether the read operation has been completed in the first plane PLANE0 in response to the status command P0, STATUS_CMD for the first plane PLANE0 and may transfer the check result to the controller 130. Therefore, the controller 130 may transfer an output command P0, OUT_CMD for the first plane PLANE0 to the memory device 150. When the read operation on the first plane PLANE0 has not been completed at the point of time at which the status command P0, STATUS_CMD for the first plane PLANE0 is input, the status command P0, STATUS_CMD for the first plane PLANE0 may be repeatedly input.

When the operation of reading data from at least one plane, among the plurality of planes PLANE0, PLANE1, PLANE2, and PLANE3, is completed, or data is completely stored in the cache buffer that is included in at least one plane, among the plurality of planes PLANE0, PLANE1, PLANE2, and PLANE3, the logic controller 401 that is included in the memory device 150 may copy, into the pipe latch P_LATCH0, the data of the cache buffer (one of CACHE<0:3>) that is included in any one plane, among the plurality of planes PLANE0, PLANE1, PLANE2, and PLANE3. At this time, the operation of copying the data of the cache buffer (one of CACHE<0:3>) that is included in any one plane into the pipe latch P_LATCH0 may be performed regardless of whether the status command STATUS_CMD is input from the controller 130.

More specifically, the logic controller 401 that is included in the memory device 150 may check whether the read operations on the respective planes PLANE0, PLANE1, PLANE2, and PLANE3 have been completed according to the order in which the read commands RD_CMD, corresponding to the third plane information PL_IP3 that is stored in the plane queue 510, are received. When the check result indicates that the read operations on the one or more planes have been completed, the logic controller 401 may select a corresponding plane and may start an operation of copying, into the pipe latch P_LATCH0, the data of the cache buffer (one of CACHE<0:3>) that is included in the selected plane.

In an embodiment, among the plurality of planes PLANE0, PLANE1, PLANE2, and PLANE3, the contents that indicate that the read command P0, RD_CMD for the first plane PLANE0, the read command P1, RD_CMD for the second plane PLANE1, the read command P2, RD_CMD for the third plane PLANE2, and the read command P3, RD_CMD for the fourth plane PLANE3 were sequentially input may be stored in the third plane information PL_IP3 that is stored in the plane queue 510. Therefore, according to the third plane information PL_IP3, the logic controller 401 may first check whether the read operation on the first plane PLANE0 has been completed, then check whether the read operation on the second plane PLANE1 has been completed, then check whether the read operation on the third plane PLANE2 has been completed, and then check whether the read operation on the fourth plane PLANE3 has been completed. When the read operations on the entire planes PLANE0, PLANE1, PLANE2, and PLANE3 have not been completed, the logic controller 401 may check again whether the read operations have been sequentially completed, starting from the first plane PLANE0.

At this time, the logic controller 401 may perform the operation of checking whether the read operations on the respective planes PLANE0, PLANE1, PLANE2, and PLANE3 have been completed, regardless of whether the status command STATUS_CMD is input from the controller 130. For example, after a read command RD_CMD is input, at each predetermined time point, the logic controller 401 may perform an operation of checking whether a read operation, corresponding to the read command RD_CMD, has been completed.

As described above, the logic controller 401 may start an operation of copying the data of the cache buffer (one of CACHE<0:3>) that is included in any one plane into the pipe latch P_LATCH0 according to the check result, indicating whether the read operations on the respective planes PLANE0, PLANE1, PLANE2, and PLANE3 have been completed, regardless of whether the status command STATUS_CMD is input. Therefore, as illustrated in FIG. 6A, the logic controller 401 may copy the data that is stored in the cache buffer CACHE0 of the first plane PLANE0 into the pipe latch P_LATCH0 (CACHE0→P_LATCH0) in response to the completion of the read operation on the first plane PLANE0 of the plurality of planes PLANE0, PLANE1, PLANE2, and PLANE3 (i.e. when the data is completely stored in the cache buffer CACHE0 of the first plane PLANE0 (PB0→CACHE0)).

For reference, among the plurality of planes PLANE0, PLANE1, PLANE2, and PLANE3, at the time of starting the operation of copying, into the pipe latch P_LATCH0, the data of the cache buffer (one of CACHE<0:3>) that is included in any one plane, among the plurality of planes PLANE0, PLANE1, PLANE2, and PLANE3, the read operations on the other planes PLANE1, PLANE2, and PLANE3, except the first plane PLANE0, might not be completed. Therefore, the read operations on the other planes PLANE1, PLANE2, and PLANE3 may be continuously performed. Therefore, the read operations on the respective planes PLANE0, PLANE1, PLANE2, and PLANE3 and the operation of copying, into the pipe latch P_LATCH0, the data of the cache buffer (one of CACHE<0:3>) that is included in any one plane on which the read operation has been completed may overlap each other.

In order to check whether the read operation on the first plane PLANE0 has been completed while the operation of copying the data that is stored in the cache buffer CACHE0 of the first plane PLANE0 into the pipe latch P_LATCH0 (CACHE0→P_LATCH0) is performed, the status command P0, STATUS_CMD for the first plane PLANE0 may be input from the controller 130. In FIG. 6A, the memory device 150 may check whether the read operation has been completed in the first plane PLANE0 in response to the status command P0, STATUS_CMD for the first plane PLANE0 and may transfer the check result to the controller 130. Therefore, the controller 130 may transfer the output command P0, OUT_CMD for the first plane PLANE0 to the memory device 150.

According to the input of the output command OUT_CMD from the controller 130, the logic controller 401 that is included in the memory device 150 may check whether the plane, corresponding to the output command OUT_CMD, coincides with the plane, corresponding to the data that is stored in the pipe latch P_LATCH0, and selectively output the data that is stored in the pipe latch P_LATCH0 to the controller 130 according to the check result.

In an embodiment, at the point of time at which the output command P0, OUT_CMD, corresponding to the first plane PLANE0, is input, the operation of copying, into the pipe latch P_LATCH0, the data that is stored in the cache buffer CACHE0 of the first plane PLANE0 (CACHE0→P_LATCH0) may be performed. That is, the plane, corresponding to the output command OUT_CMD, may coincide with the plane, corresponding to the data that is stored in the pipe latch P_LATCH0. Therefore, the data of the first plane PLANE0, stored in the pipe latch P_LATCH0, may be output to the controller 130 in response to the input of the output command P0, OUT_CMD, corresponding to the first plane PLANE0.

Unlike the situation of FIG. 6A, when the output command OUT_CMD, corresponding to the second plane PLANE1, is input during the operation of copying the data that is stored in the cache buffer CACHE0 of the first plane PLANE0 into the pipe latch P_LATCH0 (CACHE0→P_LATCH0), the operation of copying the data of the first plane PLANE0 into the pipe latch P_LATCH0 (CACHE0→P_LATCH0), which was being performed, may be immediately stopped, and an operation of resetting the pipe latch P_LATCH0 may be performed. Then, an operation of copying the data that is stored in the cache buffer CACHE1 of the second plane PLANE1 into the pipe latch P_LATCH0, and an operation of outputting the data that is stored in the pipe latch P_LATCH0 to the controller 130 may be consecutively performed.

According to the input of the output command OUT_CMD from the controller 130, the logic controller 401 that is included in the memory device 150 may check whether the plane, corresponding to the output command OUT_CMD, coincides with the plane, corresponding to the data that is stored in the pipe latch P_LATCH0, and may start an operation of selectively outputting the data that is stored in the pipe latch P_LATCH0 to the controller 130 according to the check result. Then, the logic controller 410 may remove a value, among the plurality of pieces of third plane information PL_IP3 that is stored in the plane queue 510, indicating the plane, corresponding to the output command OUT_CMD.

In an embodiment, the logic controller 401 may start the operation of checking whether the plane, corresponding to the data that is stored in the pipe latch P_LATCH0, coincides with the first plane PLANE0 after the output command P0, OUT_CMD, corresponding to the first plane PLANE0 is input and may then remove the value, among the plurality of pieces of third plane information PL_IP3 that is stored in the plane queue 510, corresponding to the first plane PLANE0.

For reference, the operation of checking whether the plane, corresponding to the output command OUT_CMD, coincides with the plane, corresponding to the data that is stored in the pipe latch P_LATCH0, may be started in response to the input of the output command OUT_CMD, and the output command OUT_CMD may be input during the operation of copying the data that is stored in the cache buffer CACHE0 of the first plane PLANE0 into the pipe latch P_LATCH0 (CACHE0→P_LATCH0).

Furthermore, the operation of copying the data that is stored in the cache buffer CACHE0 of the first plane PLANE0 into the pipe latch P_LATCH0 (CACHE0→P_LATCH0) may be ended at the point of time at which the data that is stored in the cache buffer CACHE0 of the first plane PLANE0 are all copied into the pipe latch P_LATCH0.

When the data that is read from the first plane PLANE0 is completely output (P0 DATA OUT), the logic controller 401 that is included in the memory device 150 may check again whether the read operations of the respective planes PLANE0, PLANE1, PLANE2, and PLANE3 have been completed according to the order in which the read commands RD_CMD, corresponding to the third plane information PL_IP3 that is stored in the plane queue 510, are received. At this time, before the data that is read from the first plane PLANE0 is completely output (P0 DATA OUT) after the output command P0, OUT_CMD, corresponding to the first plane PLANE0, is input, the logic controller 401 may have removed the value, among the plurality of pieces of third plane information PL_IP3 that is stored in the plane queue 510, corresponding to the first plane PLANE0.

In FIG. 6A, the read command P0, RD_CMD for the first plane PLANE0 may be input again immediately after the data that is read from the first plane PLANE0 is completely output (P0 DATA OUT). However, since there are the read commands P1 to P3, RD_CMD for the second to fourth planes PLANE1, PLANE2, and PLANE3, which have been already input before, the value, among the plurality of pieces of third plane information PL_IP3 that is stored in the plane queue 510, corresponding to the first plane PLANE0, may be stored in the last slot. That is, the third plane information PL_IP3 that is stored in the plane queue 510 may include the contents, indicating that the read command P1, RD_CMD for the second plane PLANE1, the read command P2, RD_CMD for the third plane PLANE2, the read command P3, RD_CMD for the fourth plane PLANE3, and the read command P0, RD_CMD for the first plane PLANE0 were sequentially input.

Therefore, according to the third plane information PL_IP3, the logic controller 401 may first check whether the read operation on the second plane PLANE1 has been completed, then check whether the read operation on the third plane PLANE2 has been completed, then check whether the read operation on the fourth plane PLANE3 has been completed, and then check whether the read operation on the first plane PLANE0 has been completed.

The logic controller 401 that is included in the memory device 150 may check whether the read operation on the second plane PLANE1 has been completed according to the third plane information PL_IP3, after the data that is read from the first plane PLANE0 is completely output (P0 DATA OUT). According to the check result, the logic controller 401 may start an operation of receiving data from the second plane PLANE1 and storing the received data in the pipe latch P_LATCH0. That is, after the data that is read from the first plane PLANE0 is completely output (P0 DATA OUT), the logic controller 401 may perform an operation of copying the data that is stored in the cache buffer CACHE1 of the second plane PLANE1 into the pipe latch P_LATCH0 (CACHE1→P_LATCH0).

In order to check whether the read operation on the second plane PLANE1 has been completed while the operation of copying the data that is stored in the cache buffer CACHE1 of the second plane PLANE1 into the pipe latch P_LATCH0 (CACHE1→P_LATCH0) is performed, the status command P1, STATUS_CMD for the second plane PLANE1 may be input from the controller 130. In FIG. 6A, the memory device 150 may check whether the read operation has been completed in the second plane PLANE1 in response to the status command P1, STATUS_CMD for the second plane PLANE1 and may transfer the check result to the controller 130. Therefore, the controller 130 may transfer an output command P1, OUT_CMD for the second plane PLANE1 to the memory device 150.

According to the input of the output command OUT_CMD from the controller 130, the logic controller 401 that is included in the memory device 150 may check whether the plane, corresponding to the output command OUT_CMD, coincides with the plane, corresponding to the data that is stored in the pipe latch P_LATCH0, and selectively output the data that is stored in the pipe latch P_LATCH0 to the controller 130 according to the check result.

In an embodiment, at the point of time at which the output command P1, OUT_CMD, corresponding to the second plane PLANE1, is input, the operation of copying the data that is stored in the cache buffer CACHE1 of the second plane PLANE1 into the pipe latch P_LATCH0 (CACHE1→P_LATCH0) may be being performed. That is, the plane, corresponding to the output command OUT_CMD, may coincide with the plane, corresponding to the data that is stored in the pipe latch P_LATCH0. Therefore, the data of the second plane PLANE1, stored in the pipe latch P_LATCH1, may be output to the controller 130 in response to the input of the output command P1, OUT_CMD, corresponding to the second plane PLANE1.

Unlike the situation of FIG. 6A, when the output command OUT_CMD, corresponding to the first plane PLANE0, is input during the operation of copying the data that is stored in the cache buffer CACHE1 of the second plane PLANE1 into the pipe latch P_LATCH0 (CACHE1→P_LATCH0), the operation of copying the data of the second plane PLANE1 into the pipe latch P_LATCH0 (CACHE1→P_LATCH0), which was being performed, may be immediately stopped, and the operation of resetting the pipe latch P_LATCH0 may be performed. Then, the operation of copying the data that is stored in the cache buffer CACHE0 of the first plane PLANE0 into the pipe latch P_LATCH0 and the operation of outputting the data that is stored in the pipe latch P_LATCH0 to the controller 130 may be consecutively performed.

According to the input of the output command OUT_CMD from the controller 130, the logic controller 401 that is included in the memory device 150 may check whether the plane, corresponding to the output command OUT_CMD, coincides with the plane, corresponding to the data that is stored in the pipe latch P_LATCH0, and may start the operation of selectively outputting the data that is stored in the pipe latch P_LATCH0 to the controller 130 according to the check result. Then, the logic controller 401 may remove a value, among the plurality of pieces of third plane information PL_IP3 that is stored in the plane queue 510, indicating the plane, corresponding to the output command OUT_CMD.

In an embodiment, the logic controller 401 may start the operation of checking whether the plane, corresponding to the data that is stored in the pipe latch P_LATCH0, coincides with the second plane PLANE1, after the output command P1, OUT_CMD, corresponding to the second plane PLANE1, is input, and may then remove the value, among the plurality of pieces of third plane information PL_IP3 that is stored in the plane queue 510, corresponding to the second plane PLANE1.

For reference, the operation of checking whether the plane, corresponding to the output command OUT_CMD, coincides with the plane, corresponding to the data that is stored in the pipe latch P_LATCH0, may be started in response to the input of the output command OUT_CMD, and the output command OUT_CMD may be input during the operation of copying the data that is stored in the cache buffer CACHE1 of the second plane PLANE1 into the pipe latch P_LATCH0 (CACHE1→P_LATCH0).

Furthermore, the operation of copying the data that is stored in the cache buffer CACHE1 of the second plane PLANE1 into the pipe latch P_LATCH0 (CACHE1→P_LATCH0) may be ended at the point of time at which the data that is stored in the cache buffer CACHE1 of the second plane PLANE1 are all copied into the pipe latch P_LATCH0.

When the data that is read from the second plane PLANE1 is completely output (P1 DATA OUT), the logic controller 401 that is included in the memory device 150 may check again whether the read operations on the respective planes PLANE0, PLANE1, PLANE2, and PLANE3 have been completed according to the order in which the read commands RD_CMD, corresponding to the third plane information PL_IP3 that is stored in the plane queue 510, are received. At this time, before the data that is read from the second plane PLANE1 is completely output (P1 DATA OUT) after the output command P1, OUT_CMD, corresponding to the second plane PLANE1, is input, the logic controller 401 may have removed a value, among the plurality of pieces of third plane information PL_IP3 that is stored in the plane queue 510, corresponding to the second plane PLANE1.

In FIG. 6A, the read command P1, RD_CMD for the second plane PLANE1 may be input again immediately after the data that is read from the second plane PLANE1 is completely output (P1 DATA OUT). However, since there are read commands P2, P3, and P0, RD_CMD for the third, fourth, and first planes PLANE2, PLANE3, and PLANE0, which have been already input before, the value, among the plurality of pieces of third plane information PL_IP3 stored in the plane queue 510, corresponding to the second plane PLANE1, may be stored in the last slot. That is, the third plane information PL_IP3 stored in the plane queue 510 may include the contents, indicating that the read command P2, RD_CMD for the third plane PLANE2, the read command P3, RD_CMD for the fourth plane PLANE3, the read command P0, RD_CMD for the first plane PLANE0, and the read command P1, RD_CMD for the second plane PLANE1 were sequentially input.

Therefore, according to the third plane information PL_IP3, the logic controller 401 may first check whether the read operation on the third plane PLANE2 has been completed, then check whether the read operation on the fourth plane PLANE3 has been completed, then check whether the read operation on the first plane PLANE0 has been completed, and then check whether the read operation on the second plane PLANE1 has been completed.

The logic controller 401 that is included in the memory device 150 may check whether the read operation on the third plane PLANE2 has been completed according to the third plane information PL_IP3, after the data that is read from the second plane PLANE1 is completely output (P1 DATA OUT). According to the check result, the logic controller 401 may start an operation of receiving data from the third plane PLANE2 and storing the received data in the pipe latch P_LATCH0. That is, after the data that is read from the second plane PLANE1 is completely output (P1 DATA OUT), the logic controller 401 may perform an operation of copying the data that is stored in the cache buffer CACHE2 of the third plane PLANE2 into the pipe latch P_LATCH0 (CACHE2→P_LATCH0).

In the above-described way, in response to the completion of the output of the data that is read from the third plane PLANE2 (P2 DATA OUT), the logic controller 401 may perform an operation of copying the data that is stored in the cache buffer CACHE3 of the fourth plane PLANE3 into the pipe latch P_LATCH0 (CACHE3→P_LATCH0).

For reference, immediately after the data that is read from the first to third planes PLANE0, PLANE1, and PLANE2, respectively, are completely output (P0 DATA OUT, P1 DATA OUT, and P2 DATA OUT), the read commands P0, RD_CMD, P1, RD_CMD, and P2, RD_CMD for the respective first to third planes PLANE0, PLANE1, and PLANE2 may be input again. Therefore, the operations of reading the data that is stored in the first to third planes PLANE0, PLANE1, and PLANE2 into the page buffers (CELL→PB0, CELL→PB1, and CELL→PB2) and the operations of migrating the data that is stored in the page buffers to the cache buffers (PB0→CACHE0, PB1→CACHE1, and PB2→CACHE2) may be performed again. However, FIG. 6A does not illustrate operations that correspond to the read commands P0, RD_CMD, P1, RD_CMD, and P2, RD_CMD for the respective first to third planes PLANE0, PLANE1, and PLANE2, which are input again.

FIG. 6B is a timing diagram illustrating an operation, indicated by a dotted box represented by reference numeral '600' in FIG. 6A, in more detail.

That is, in FIG. 6B, the operation of outputting first data that is read from the first plane PLANE0 of the memory device 150 (P0 DATA OUT) and the operation of outputting second data that is read from the second plane PLANE1 of the memory device 150 (P1 DATA OUT) are illustrated in more detail than in FIG. 6A.

In particular, FIG. 6B is based on the assumption that data that is stored in the cache buffer CACHE0, CACHE1, CACHE2, or CACHE3 is split and then the split data is sequentially transmitted to the pipe latch P_LATCH0, considering that the size of the pipe latch P_LATCH0 is smaller than that of the cache buffer CACHE0, CACHE1, CACHE2, or CACHE3 that are included in the memory device 150 when the memory device 150 is actually mounted. Furthermore, FIG. 6B is based on the assumption that the pipe latch P_LATCH0 includes a plurality of sub pipe latches P_LATCH0_0, P_LATCH0_1, P_LATCH0_2, and P_LATCH0_3 that are operated in parallel to one another, considering that the number of the pipe latches P_LATCH0 is smaller than the number of data pads DQ when the memory device 150 is actually mounted.

For example, it may be assumed that the pipe latch P_LATCH0 includes four sub pipe latches P_LATCH0_0, P_LATCH0_1, P_LATCH0_2, and P_LATCH0_3, the size of data that is stored in the cache buffer CACHE0, CACHE1, CACHE2, or CACHE3 is 4 kByte, and the size of data that is processed at a certain time by the sub pipe latches P_LATCH0_0, P_LATCH0_1, P_LATCH0_2, and P_LATCH0_3 is 512 Byte. In this case, the data of 4 kByte, stored in the cache buffer CACHE0, CACHE1, CACHE2, or CACHE3, may be split into eight data D0, D1, D2, D3, D4, D5, D6, and D7, each having a size of 512 Byte, and then the split data is sequentially output through one data pad DQ via the four sub pipe latches P_LATCH0_0, P_LATCH0_1, P_LATCH0_2, and P_LATCH0_3. For reference, the numbers used in the present embodiment (i.e., 4 kByte, 512 Byte, four, and one) are only values which are suggested as examples for convenience of description. In reality, the numbers may be set to other values depending on the type of the memory device or a designer's selection.

Referring to FIGS. 6A and 6B, the first ⅛ data D0 that is read from the first plane PLANE0 of the memory device 150 may be output to the data pad DQ through the first sub pipe latch P_LATCH0_0, the second ⅛ data D1 that is read from the first plane PLANE0 of the memory device 150 may be output to the data pad DQ through the second sub pipe latch P_LATCH0_1, the third ⅛ data D2 that is read from the first plane PLANE0 of the memory device 150 may be output to the data pad DQ through the third sub pipe latch P_LATCH0_2, and then the fourth ⅛ data D3 that is read from the first plane PLANE0 of the memory device 150 may be output to the data pad DQ through the fourth sub pipe latch P_LATCH0_3. Subsequently, the fifth ⅛ data D4 that is read from the first plane PLANE0 of the memory device 150 may be output to the data pad DQ through the first sub pipe latch P_LATCH0_0 again, the sixth ⅛ data D5 that is read from the first plane PLANE0 of the memory device 150 may be output to the data pad DQ through the second sub pipe latch P_LATCH0_1 again, the seventh ⅛ data D6 that is read from the first plane PLANE0 of the memory device 150 may be output to the data pad DQ through the third sub pipe latch P_LATCH0_2 again, and then the eighth ⅛ data D7 that is read from the first plane PLANE0 of the memory device 150 may be output to the data pad DQ through the fourth sub pipe latch P_LATCH0_3 again.

When the first data that is read from the first plane PLANE0 that is included in the memory device 150 are completely output (P0 DATA OUT, D0 to D7), the pipe latch P_LATCH0 that is included in the memory device 150 may be reset regardless of whether the status command P1, STATUS_CMD for the second plane PLANE1 is input.

After the pipe latch P_LATCH0 that is included in the memory device 150 is reset, the data D0 and D4 that are read from the second plane PLANE1 of the memory device 150 may be coped into the first pipe latch P_LATCH0. Furthermore, the data D0 to D7 that are stored in the pipe latch P_LATCH0 that is included in the memory device 150 may be sequentially output in response to the output command P1, OUT_CMD.

Even when the second data that is read from the second plane PLANE1 are output to the data pad DQ through the pipe latch P_LATCH0 (P1 DATA OUT), the memory device 150 may split the second data into eight data D0, D1, D2, D3, D4, D5, D6, and D7, like the first data (P0 DATA OUT), and may then sequentially output the data D0, D1, D2, D3, D4, D5, D6, and D7 through one data pad DQ via the four sub pipe latches P_LATCH0_0, P_LATCH0_1, P_LATCH0_2, and P_LATCH0_3.

Figure 7:
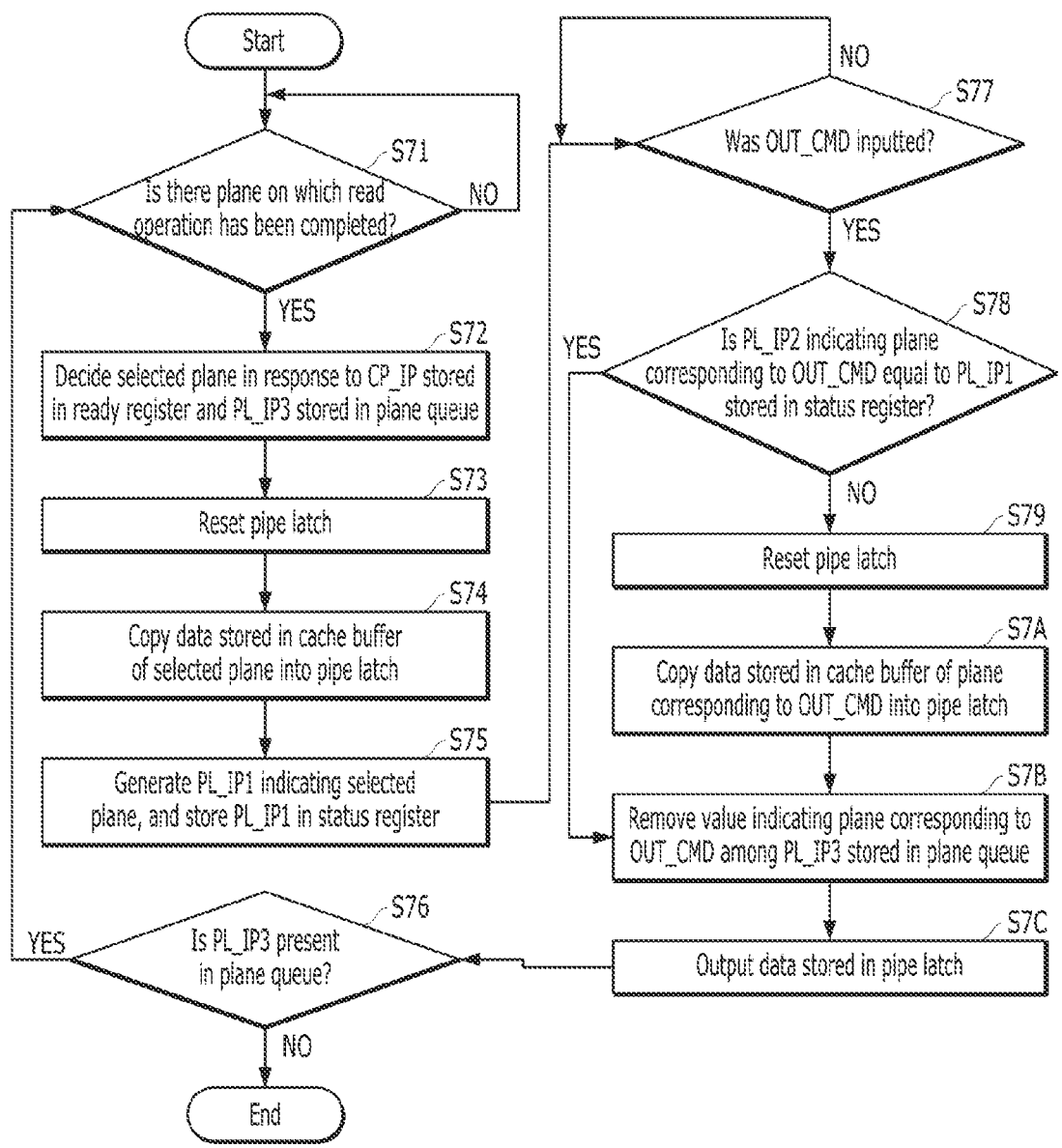
FIGS. 7 and 8 are flowcharts for describing another example of the read operation performed by the memory device in accordance with the present embodiment.
Figure 8:
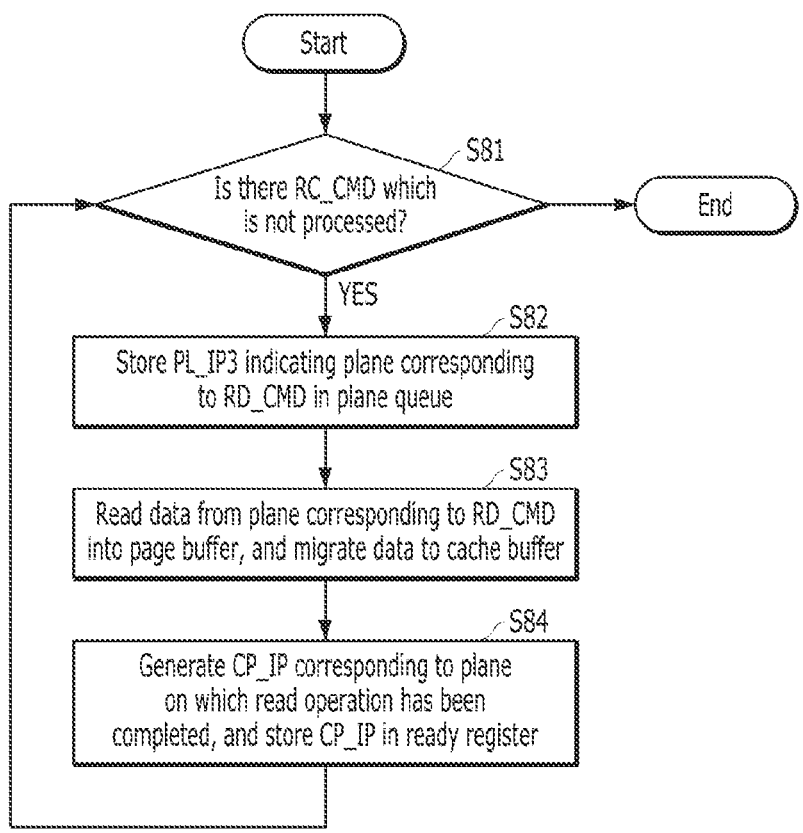

FIGS. 7 and 8 are flowcharts for describing another example of the read operation performed by the memory device in accordance with the present embodiment.

As described with reference to FIGS. 6A and 6B, when the memory device 150 receives the read command RD_CMD from the controller 130 and performs a read operation, there may be a plane on which a read operation has been completed even though the output command OUT_CMD is not input. In this case, referring to FIG. 7, the memory device 150 may copy data of the corresponding plane into the pipe latch P_LATCH0.

Specifically, as described with reference to FIGS. 6A and 6B, the memory device 150 may perform read operations on the plurality of planes PLANE0, PLANE1, PLANE2, and PLANE3 that are in parallel to one another in response to the read command RD_CMD received from the controller 130. At this time, the memory device 150 may check whether the read operation has been completed in one or more planes of the plurality of planes PLANE0, PLANE1, PLANE2, and PLANE3, in step S71. That is, the memory device 150 may check whether data that is read from at least one plane, among the plurality of planes PLANE0, PLANE1, PLANE2, and PLANE3 has been migrated to the cache buffer (one of CACHE<0:3>) of the corresponding plane, in step S71.

When the check result of step S71 indicates that there is no plane on which the read operation has been completed (NO in step S71), the memory device 150 may wait until there is a plane on which the read operation has been completed.

When the check result of step S71 indicates that there is a plane on which the read operation has been completed (YES in step S71), the memory device 150 may decide, as a selected plane, any one plane, among the plurality of planes on which the read operations have been completed, in response to the completion information CP_IP that is stored in the ready register 520 and the third plane information PL_IP3 that is stored in the plane queue 510, in step S72. For example, when only the read operation on the first plane PLANE0, among the plurality of planes PLANE0, PLANE1, PLANE2, and PLANE3, is completed, and the read operations on the other planes PLANE1, PLANE2, and PLANE3 have not been completed, the memory device 150 may decide only the first plane PLANE0 as the selected plane according to the completion information CP_IP. For another example, when the read operations on the second to fourth planes PLANE1, PLANE2, and PLANE3, among the plurality of planes PLANE0, PLANE1, PLANE2, and PLANE3, are completed, the memory device 150 may decide, as the selected plane, the plane that has first received the read command RD_CMD, among the second to fourth planes PLANE1, PLANE2, and PLANE3, according to the third plane information PL_IP3.

After step S72, the pipe latch P_LATCH0 of the memory device 150 may be reset in step S73.

After step S73, the data that is stored in the cache buffer (one of CACHE<0:3>) of the selected plane decided in step S72 may be copied into the pipe latch P_LATCH0 of the memory device 150 in step S74. For example, when the first plane PLANE0 of the plurality of planes PLANE0, PLANE1, PLANE2, and PLANE3 is decided as the selected plane in step S72, the data that is stored in the cache buffer CACHE0 of the first plane PLANE0 of the memory device 150 may be copied into the pipe latch P_LATCH0 of the memory device 150.

After step S74, the memory device 150 may generate the first plane information PL_IP1, indicating the selected plane, decided in step S72, and may store the generated information in the status register 530, in step S75. For example, when the first plane PLANE0 of the plurality of planes PLANE0, PLANE1, PLANE2, and PLANE3 is decided as the selected plane in step S72, the memory device 150 may generate the first plane information PL_IP1, indicating the first plane PLANE0.

After step S75, the memory device 150 may perform an operation of checking whether the output command OUT_CMD was input, in step S77.

When the output command OUT_CMD is not input in step S77 (NO in step S77), the memory device 150 may wait and might not perform any operation. This may occur because the data is stored in the pipe latch P_LATCH0 of the memory device 150 through steps S71 to S75.

When the output command OUT_CMD is input in step S77 (YES in step S77), the memory device 150 may check whether the value of the second plane information PL_IP2, indicating the plane that corresponds to the output command OUT_CMD, is equal to the value of the first plane information PL_IP1 stored in the status register 530, in step S78. For example, when the first plane information PL_IP1 that is stored in the status register 530 indicates the first plane PLANE0 of the plurality of planes PLANE0, PLANE1, PLANE2, and PLANE3, and the second plane information PL_IP2 indicates the first plane PLANE0, the memory device 150 may determine that the first plane information PL_IP1 and the second plane information PL_IP2 are equal to each other.

When the determination result of step S78 indicates that the first plane information PL_IP1 and the second plane information PL_IP2 are equal to each other (YES in step S78), the memory device 150 may remove a value, among the plurality of pieces of third plane information PL_IP3 that is stored in the plane queue 510, corresponding to the second plane information PL_IP2, indicating the plane that corresponds to the output command OUT_CMD, in step S7B. For example, when the second plane information PL_IP2 indicates the first plane PLANE0 of the plurality of planes PLANE0, PLANE1, PLANE2, and PLANE3, the memory device 150 may remove information, among the plurality of pieces of third plane information PL_IP3 that is stored in the plane queue 510, indicating the first plane PLANE0. In this way, the third plane information PL_IP3, indicating the first plane PLANE0, removed from the plane queue 510, may be regenerated when the read command RD_CMD, corresponding to the first plane PLANE0, is received.

After step S7B, the data that is stored in the pipe latch P_LATCH0 of the memory device 150 may be output to the controller 130 in step S7C.

When the values of the first plane information PL_IP1 and the second plane information PL_IP2 are not equal to each other in step S78 (NO in step S78), the pipe latch P_LATCH0 of the memory device 150 may be reset in step S79. For example, when the first plane information PL_IP1 that is stored in the status register 530 indicates the first plane PLANE0 of the plurality of planes PLANE0, PLANE1, PLANE2, and PLANE3, and the second plane information PL_IP2 indicates the second plane PLANE1, the memory device 150 may determine that the first plane information PL_IP1 and the second plane information PL_IP2 are not equal to each other.

The above-described operation of resetting the pipe latch P_LATCH0 in step S79 may indicate the discarding of the data that is stored in the pipe latch P_LATCH0 of the memory device 150 through steps S71 to S75.

After step S79, the memory device 150 may copy, into the pipe latch P_LATCH0, the data that is stored in the cache buffer CACHE of the plane indicated by the second plane information PL_IP2 (i.e., the plane), corresponding to the output command OUT_CMD, in step S7A. For example, when the second plane information PL_IP2 indicates the second plane PLANE1 of the plurality of planes PLANE0, PLANE1, PLANE2, and PLANE3, the memory device 150 may copy the data that is stored in the cache buffer CACHE1 of the second plane PLANE1 into the pipe latch P_LATCH0.

After step S7A, the memory device 150 may remove a value, among the plurality of pieces of third plane information PL_IP3 that is stored in the plane queue 510, corresponding to the second plane information PL_IP2, indicating the plane that corresponds to the output command OUT_CMD, in step S7B. For example, when the second plane information PL_IP2 indicates the second plane PLANE1 of the plurality of planes PLANE0, PLANE1, PLANE2, and PLANE3, the memory device 150 may remove information, among the plurality of pieces of third plane information PL_IP3 that is stored in the plane queue 510, indicating the second plane PLANE1. In this way, the third plane information PL_IP3, indicating the second plane PLANE1, removed from the plane queue 510, may be regenerated when the read command RD_CMD, corresponding to the second plane PLANE1, is received.

After step S7B, the data that is stored in the pipe latch P_LATCH0 of the memory device 150 may be output to the controller 130 in step S7C.

FIG. 8 shows that, when receiving the read command RD_CMD from the controller 130 and performing a read operation, the memory device 150 may set the plane queue 510 and the ready register 520. At this time, the operations of FIGS. 7 and 8 may be performed in parallel to each other.

Specifically, the memory device 150 may check whether there is a read command RD_CMD that was input from the controller 130 but has not been processed, in step S81.

When the check result of step S81 indicates that there is no read command RD_CMD that has not been processed (NO in step S81), the memory device 150 may end the read operation. At this time, the operation of ending the read operation in FIG. 8 may indicate that an operation of reading data from the plurality of planes PLANE0, PLANE1, PLANE2, and PLANE3 and migrating the read data to the plurality of cache buffers CACHE0, CACHE1, CACHE2, and CACHE3, respectively, has ended.

When the check result of step S81 indicates that there is a read command RD_CMD that has not been processed (YES in step S81), the memory device 150 may store, in the plane queue 510, the third plane information PL_IP3, indicating the plane, corresponding to the read command RD_CMD, in step S82. For example, when the first plane PLANE0 of the plurality of planes PLANE0, PLANE1, PLANE2, and PLANE3 is the plane, corresponding to the read command RD_CMD, the memory device 150 may store the third plane information PL_IP3, indicating the first plane PLANE0, in the plane queue 510.

After step S82, the memory device 150 may read the data from the plane, corresponding to the read command RC_CMD, into the page buffer PB, and migrate the read data to the cache buffer CACHE, in step S83. For example, when the first plane PLANE0 of the plurality of planes PLANE0, PLANE1, PLANE2, and PLANE3 is the plane, corresponding to the read command RD_CMD, the memory device 150 may read the data from the first plane PLANE0 into the page buffer PB0 of the first plane PLANE0 and may migrate the read data to the cache buffer CACHE0 of the first plane PLANE0.

Since the data is stored in the cache buffer CACHE of the plane, corresponding to the read command RD_CMD, through the operation of step S83, the read operation on the plane, corresponding to the read command RD_CMD, may have been ended. Therefore, after step S83, the memory device 150 may generate the completion information CP_IP, corresponding to the plane on which the read operation has been completed, and may store the generated information in the ready register 520, in step S84. For example, when the first plane PLANE0 of the plurality of planes PLANE0, PLANE1, PLANE2, and PLANE3 is the plane, corresponding to the read command RD_CMD, the data may be stored in the cache buffer CACHE0 of the first plane PLANE0 through step S83. Then, the read operation may be completed. Therefore, the memory device 150 may generate the completion information CP_IP, corresponding to the first plane PLANE0, as the ready value READY and may store the generated information in the ready register 520, in step S84.

Although various embodiments have been described for illustrative purposes, it will be apparent to those skilled in the art that various changes and modifications may be made without departing from the spirit and scope of the invention as defined in the following claims.

What is claimed is:

1. A memory device comprising:
    a plurality of planes, each configured to input/output data in units of pages;
    a latch that is shared by the plurality of planes, the latch configured to perform a read operation on one or more planes of the plurality of planes in response to one or more read commands, receive data from any one plane, among the plurality of planes, and store the received data; and
    a logic controller configured to compare first plane information, corresponding to the data that is stored in the latch, to second plane information, corresponding to an output command that is received after the read command is received, in response to the output command, and configured to either output the data of the latch as is, or store read data from the plane indicated by the second plane information back into the latch and then output the data of the latch, according to the comparison result between the first plane information and the second plane information.

2. The memory device of claim 1, wherein the logic controller comprises:
    a plane queue configured to store a plurality of pieces of third plane information, which are plane information, corresponding to the one or more read commands, according to the order in which the plurality of pieces of third plane information are received;
    a selection storage unit configured to store, in the latch, data of a selected plane that is indicated by the first plane information, which is decided in response to the third plane information that is stored in the plane queue and completion information, indicating whether one or more read operations performed in the one or more planes are completed; and
    a comparison output configured to compare the first plane information to the second plane information in response to the output command and configured to output the data of the latch when the comparison result indicates that the first plane information and the second plane information are equal to each other.

3. The memory device of claim 2, wherein the logic controller further comprises a status register configured to store the first plane information,
    wherein the comparison output unit compares the first plane information that is received from the status register to the second plane information.

4. The memory device of claim 2, further comprising a plurality of page buffers and a plurality of cache buffers, which correspond to the plurality of planes, respectively, and
    wherein the logic controller migrates, to one or more cache buffers, data that is read into one or more page buffers by performing a read operation on one or more planes, corresponding to the one or more read commands, respectively.

5. The memory device of claim 4, wherein the selection storage unit copies, into the latch, the data that is stored in the cache buffer, among the plurality of cache buffers, corresponding to the selected plane, regardless of whether the output command is received.

6. The memory device of claim 2, wherein the selection storage unit checks the completion information, corresponding to one or more planes, among the one or more planes, according to the order in which the one or more read commands, corresponding to the third plane information that is stored in the plane queue, are received, selects any one plane, among the one or more planes, which first receives the read command and on which the read operation has been completed as the selected plane according to the check result, and generates the first plane information.

7. The memory device of claim 6, wherein the logic controller further comprises a ready register configured to store the completion information, and
    wherein the selection storage unit checks the completion information that is received from the ready register, the completion information, corresponding to one or more planes, according to the order in which the one or more read commands, corresponding to the third plane information that is stored in the plane queue, are received.

8. The memory device of claim 7, wherein the logic controller stores, in the ready register, the completion information that is generated in response to the completions of the read operations of the one or more planes, corresponding to the one or more read commands, and outputs the completion information that is stored in the ready register in response to a status command that is received between the read command and the output command.

9. The memory device of claim 2, wherein, when the comparison result indicates that the first plane information and the second plane information are not equal to each other, the comparison output unit receives data that is read from the plane, among the plurality of planes, indicated by the second plane information, stores the received data in the latch, and then outputs the data of the latch.

10. The memory device of claim 9, wherein the comparison output unit checks the comparison result and then removes a value, among the plurality of pieces of third plane information that is stored in the plane queue, corresponding to the second plane information.

11. An operation method of a memory device which comprises a plurality of planes, each configured to input/output data in units of pages, and a latch that is shared by the plurality of planes, the operation method comprising:
performing a read operation on one or more planes of the plurality of planes in response to one or more read commands, receiving data from any one plane, and storing the received data;
comparing first plane information, corresponding to the data that is stored in the latch, to second plane information, corresponding to an output command that is received after the read command is received, in response to the output command; and
either outputting the data of the latch as is, or storing read data from the plane indicated by the second plane information back into the latch and then outputting the data of the latch, according to the comparison result between the first plane information and the second plane information.

12. The operation method of claim 11, wherein the memory device further comprises a plane queue,
wherein the performing of the read operation, the receiving of the data, and the storing of the data comprises:
storing, in the plane queue, a plurality of pieces of third plane information that are plane information, corresponding to the one or more read commands, according to the order in which the plurality of pieces of third plane information are received; and
storing, in the latch, data of a selected plane that is indicated by the first plane information, which is decided in response to the third plane information that is stored in the plane queue, and completion information, indicating whether one or more read operations that are performed in the one or more planes are completed.

13. The operation method of claim 12, wherein the comparing of the first plane information to the second plane information and the outputting of the data comprises:
comparing the first plane information, among the plurality of pieces of third plane information that is stored in the plane queue, indicating the selected plane, to the second plane information in response to the output command; and
outputting the data of the latch when a comparison result of the comparing of the first plane information to the second plane information indicates that the first plane information and the second plane information are equal to each other.

14. The operation method of claim 13, wherein the storing of the data in the latch comprises:
checking the completion information, corresponding to respective one or more planes, according to the order in which the one or more read commands, corresponding to the third plane information that is stored in the plane queue, are received; and
selecting, as the selected plane, any one plane, among the one or more planes, which has first received the read command and on which the read operation has been completed, according to the check result of the checking of the completion information, and generating the first plane information.

15. The operation method of claim 14, wherein the memory device further comprises a status register configured to store the first plane information, and
wherein the comparing of the first plane information to the second plane information comprises comparing the first plane information that is received from the status register to the second plane information.

16. The operation method of claim 14, wherein the memory device further comprises a ready register configured to store the completion information, and
wherein the checking of the completion information comprises checking, the completion information that is received from the ready register, the completion information corresponding to one or more planes according to the order in which the one or more read commands, corresponding to the third plane information that is stored in the plane queue, are received.

17. The operation method of claim 16, wherein the performing of the read operation, the receiving of the data, and the storing of the data further comprises:
storing the completion information in the ready register, the completion information being generated in response to the completion of the read operations of the one or more planes, corresponding to the one or more read commands; and
outputting the completion information that is stored in the ready register in response to a status command that is received between the read command and the output command.

18. The operation method of claim 13, wherein the comparing of the first plane information to the second plane information and the outputting of the data further comprises:
receiving data that is read from the plane, among the plurality of planes, indicated by the second plane information, storing the received data in the latch, and then outputting the data of the latch, when the comparison result of the comparing of the first plane information to the second plane information indicates that the first plane information and the second plane information are not equal to each other; and
removing a value, among the plurality of pieces of third plane information that are stored in the plane queue, corresponding to the second plane information, after the comparing of the first plane information to the second plane information.

19. The operation method of claim 12, wherein the memory device further comprises a plurality of page buffers and a plurality of cache buffers, which correspond to the plurality of planes, respectively, and
wherein the operation method further comprises migrating, to one or more cache buffers, data that is read into one or more page buffers by performing a read operation on one or more planes, corresponding to the one or more read commands, respectively.

20. The operation method of claim 19, wherein the storing of the data in the latch comprises copying, into the latch, the data that is stored in the cache buffer, among the plurality of cache buffers, corresponding to the selected plane, regardless of whether the output command is received.

\* \* \* \* \*